US011618229B2

(12) United States Patent
Tomassoni et al.

(10) Patent No.: US 11,618,229 B2
(45) Date of Patent: Apr. 4, 2023

(54) MODULAR TIRE TURN-UP APPARATUS

(71) Applicant: BRIDGESTONE AMERICAS TIRE OPERATIONS, LLC, Nashville, TN (US)

(72) Inventors: Nikolas R. Tomassoni, Nashville, TN (US); Phillip T. Brasher, Jr., Nashville, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 12 days.

(21) Appl. No.: 17/256,764

(22) PCT Filed: Jun. 20, 2019

(86) PCT No.: PCT/US2019/038177
§ 371 (c)(1),
(2) Date: Dec. 29, 2020

(87) PCT Pub. No.: WO2020/013969
PCT Pub. Date: Jan. 16, 2020

(65) Prior Publication Data
US 2021/0362449 A1 Nov. 25, 2021

Related U.S. Application Data

(60) Provisional application No. 62/695,902, filed on Jul. 10, 2018.

(51) Int. Cl.
*B29D 30/32* (2006.01)
(52) U.S. Cl.
CPC ...... *B29D 30/32* (2013.01); *B29D 2030/3264* (2013.01)

(58) Field of Classification Search
CPC ............ B29D 2030/3264; B29D 30/24; B29D 2030/3221; B29D 2030/3257; B29D 2030/3278; B29D 30/244
(Continued)

(56) References Cited

U.S. PATENT DOCUMENTS 3,645,828 A * 2/1972 Bal ..................... B29D 30/247
156/402
3,692,605 A 9/1972 Cantarutti
(Continued)

FOREIGN PATENT DOCUMENTS

EP 1771295 B1 9/2008
JP 2005319598 A * 11/2005
(Continued)

OTHER PUBLICATIONS

ESpaceNet Translation of JP5110973 (Year: 2022).*
(Continued)

*Primary Examiner* — Robert C Dye
*Assistant Examiner* — Alexander D Booth

(57) ABSTRACT

A tire turn-up apparatus for selectively engaging a cylindrical tire building drum may include a base and a first plurality of finger assemblies. The tire building drum may be a selected drum from a group of drums of different drum diameters. Each finger assembly may have a backstop connected to the base and a finger pivotally connected to the backstop. Each finger may be moveable between a radially retracted and extended position to turn-up the tire carcass. Each finger may be radially adjustable on its respective backstop to align with different drum diameters.

9 Claims, 17 Drawing Sheets

(58) Field of Classification Search
USPC .......................................................... 156/132
See application file for complete search history.

(56) References Cited

U.S. PATENT DOCUMENTS

| | | | |
|---|---|---|---|
| 3,721,600 | A | 3/1973 | Cantarutti |
| 4,087,306 | A | 5/1978 | Head et al. |
| 4,362,592 | A | 12/1982 | Ruppel |
| 4,508,586 | A | 4/1985 | Brown et al. |
| 6,318,434 | B1 * | 11/2001 | Gutknecht ........... B29D 30/245 156/402 |
| 7,892,376 | B2 | 2/2011 | Ogawa |
| 2003/0136499 | A1 | 7/2003 | Boiteau |
| 2005/0115661 | A1 | 6/2005 | Zemla et al. |
| 2006/0180263 | A1 | 8/2006 | Takasuka |
| 2010/0193137 | A1 | 8/2010 | Morisaki |
| 2011/0024054 | A1 * | 2/2011 | Iwasaki ................. B29D 30/32 156/414 |
| 2012/0222821 | A1 | 9/2012 | Hanke et al. |
| 2014/0034221 | A1 | 2/2014 | Bignogno et al. |
| 2015/0047771 | A1 | 2/2015 | Cheng et al. |
| 2017/0326826 | A1 * | 11/2017 | Hinc .................... B29D 30/248 |

FOREIGN PATENT DOCUMENTS

| | | | |
|---|---|---|---|
| JP | 5110973 | B2 * | 12/2012 |
| JP | 5164249 | B2 * | 3/2013 |

OTHER PUBLICATIONS

ESpaceNet Translation of JP5164249 (Year: 2022).*
ESpaceNet Translation of JP2005319598 (Year: 2022).*
International Preliminary Report on Patentability of application No. PCT/US2019/038177, dated Jan. 12, 2021. 5 pages (not prior art).
International Search Report for corresponding PCT/US2019/038177, dated Oct. 1, 2019, 10 pages (not prior art).

* cited by examiner

MODULAR TIRE TURN-UP APPARATUS

BACKGROUND OF THE INVENTION

1. Field of the Invention

The present invention relates generally to a turn-up apparatus for turning the edges of a tire carcass.

More particularly, this invention pertains to a modular tire turn-up apparatus for selectively engaging a separate tire building drum to turn-up the edges of a tire carcass wound thereon.

2. Description of the Prior Art

In current tire building operations, one production step takes place on a tire building drum. The tire building drum supports a tire carcass which initially rests flat on the tire building drum. Edges of the tire carcass are turned up by turn-up equipment (e.g., bladder, fingers, or the like) integrated into the tire building drum. These integrated tire building turn-up drums have limitations however. Each integrated tire building turn-up drum is of a set diameter, therefore each different tire size requires a different integrated drum. Integrated tire building turn-up drums are very expensive and not well suited for traditional production line manufacture. The tire must be removed from the integrated tire building turn-up drum and transferred to a different drum for further production steps. Maintenance on such integrated drums can often be difficult and time consuming, which results in downtime for the machine and lost productivity.

BRIEF SUMMARY OF THE INVENTION

There exists a need for improvements in tire building operations, specifically with regard to the process of turning up the edge portions of a tire carcass disposed on a tire building drum. A new tire building system incorporates simplified independent tire building drums and a tire turn-up apparatus that is completely external to the tire building drums. The external tire turn-up apparatus is adjustably configured in order to be compatible with tire building drums of different diameters and tire building drums having differing numbers of guide slots. These simplified tire building drums may move along a production line type assembly system while carrying a tire carcass for multiple operations instead of removing the tire and placing it on another drum for each operation. This new tire building system will benefit assembly speeds and reduce downtime when a particular drum or a particular tire turn-up apparatus requires service or repair.

The new tire building system incorporates a new and completely adjustable tire turn-up apparatus to turn-up the tire carcass without any mechanisms needed inside the tire building drum which carries the tire carcass. The tire turn-up apparatus is completely external to the tire building drum. The apparatus may have mechanical fingers which may enter the drum beneath the outer drum surface and exit the guide slots once the fingers reach a bead disposed on the tire carcass. The apparatus has flexibility to change the set diameters of the fingers to the necessary position depending on the size of the tire building drum and associated tire to be assembled. The device further has flexibility to reposition and add mechanical fingers depending on the diameter of a selected tire building drum and the number of guide slots of the tire building drum.

In one embodiment, a tire building system is provided. The tire building system includes a tire building drum and a tire turn-up device. The tire building drum may include a cylindrical outer drum surface, an inner drum surface, a first drum end, and a second drum end. The tire building drum may further define a lengthwise direction between the first and second drum ends. Each of the first and second drum ends may include a plurality of guide slots disposed between the inner drum surface and the outer drum surface. The guide slots may extend parallel to the lengthwise direction. The guide slots may be open at the respective drum end. The guide slots may be spaced equally circumferentially around the first and second drum ends. The tire turn-up device may be configured to selectively engage and disengage the drum. The tire turn-up device may include a first plurality of fingers configured to be received through the plurality of guide slots. The first plurality of fingers may be movable between a radially retracted position and a radially extended position.

The tire turn-up device of such a tire building system may be configured to move in the lengthwise direction to engage and disengage the tire building drum.

The first plurality of fingers of such a tire building system may be positioned parallel with the lengthwise direction when positioned in the radially retracted position.

The tire building drum of such a tire building system may be a selected drum of a group of drums of different drum diameters. The first plurality of fingers may be arranged in a circular equally spaced first finger pattern. The tire turn-up device may be configured such that a first finger diameter of the first finger pattern is adjustable to correspond to the drum diameter of the selected drum.

The first plurality of fingers of such a tire building system may have a first configuration where the fingers are equally spaced in a first finger pattern. The first plurality of fingers may further have a second configuration where the fingers are repositioned to allow insertion of a second plurality of fingers. In the second configuration, the combined first and second pluralities of fingers may be equally spaced in a second finger pattern.

The tire building drum may include a plurality of ramps. Each ramp of the plurality of ramps may be associated with one of the guide slots. The ramps may be configured to engage the first plurality of fingers when the first plurality of fingers are in the radially retracted position. The tire turn-up device may be configured to move in the lengthwise direction toward the drum in order to cause the first plurality of fingers to engage the plurality of ramps. The plurality of ramps may be configured to guide movement of the plurality of fingers between the radially retracted position and the radially extended position as the turn-up device is moved in the longitudinal direction toward the drum.

In another embodiment, a tire turn-up apparatus for selectively engaging a cylindrical tire building drum is provided. The tire turn-up apparatus includes a base and a first plurality of finger assemblies. The base may be centered on a longitudinal axis and may be movable along the longitudinal axis. Each finger assembly of the first plurality of finger assemblies may include a backstop and a finger pivotally connected to the backstop. The backstop may be connected to the base. The finger may be pivotally connected at a pivotal connection to the backstop. The finger may be movable between a radially retracted position and a radially extended position. The finger may further have a free end.

The pivotal connection of each finger of such a tire turn-up apparatus may be radially adjustable on its respective backstop to define an adjustable finger pattern diameter. Each finger may be parallel to the longitudinal axis when in the radially retracted position. Alternatively, the radially retracted position of each finger may be configured to adjust to an outwardly directed acute angle relative to the longitudinal axis.

The pivotal connection of each finger of such a tire turn-up apparatus may be radially fixed on its respective backstop to define a fixed finger pattern diameter. The radially retracted position of each finger may be configured to adjust to an outwardly directed acute angle relative to the longitudinal axis.

The first plurality of finger assemblies of such a tire turn-up apparatus may have a first configuration where the finger assemblies are equally circumferentially spaced in a first finger pattern having a first diameter. The first plurality of finger assemblies may have a second configuration where the finger assemblies are repositioned circumferentially on the base to allow insertion of a second plurality of finger assemblies. In the second configuration, the combined first and second pluralities of finger assemblies are equally circumferentially spaced in a second finger pattern having a second diameter. The second configuration of the first plurality of finger assemblies may include at least one gap configured to receive the second plurality of finger assemblies. The at least one gap may include multiple gaps equally circumferentially spaced around the base.

Each finger assembly of such a tire turn-up apparatus may further include an actuator connected between its respective finger and its respective backstop. The actuator may be configured to move its respective finger between the radially retracted position and the radially extended position. Each actuator may be pivotally connected to its respective backstop. Each actuator may further be radially adjustable in position relative to the backstop.

In another embodiment, a method of turning up an end of a tire carcass is provided. The method may include the steps of: (a) engaging a first drum of a first diameter with a separable turn-up device, the first drum having a first tire carcass disposed thereon; (b) turning up an end of the first tire carcass with the turn-up device; (c) disengaging the turn up device from the first drum; (d) adjusting a diameter of the turn-up device; (e) engaging a second drum of a second diameter with the adjusted turn-up device, the second drum having a second tire carcass disposed thereon; and (f) turning up an end of the second tire carcass with the adjusted turn-up device.

Step (a) of such a method may further include aligning a plurality of guide slots of the first drum with a plurality of turn-up fingers of the separable turn-up device. Step (b) may further include moving the turn-up fingers from a radially retracted position to a radially extended position to turn-up the end of the first tire carcass. Step (c) may further include returning the turn-up fingers to the radially retracted position.

Step (a) of such a method may further include moving the tire turn-up device along a lengthwise direction to engage a plurality of ramps of the first drum with free ends of a plurality of turn-up fingers of the separable turn-up device. Step (d) may further include adjusting a radially retracted positioned of the plurality of turn-up fingers to an outwardly directed acute angle and may include aligning the free end of each turn-up finger with one of the ramps of the first drum.

Steps (b) and (f) of such a method may each further include actuating a plurality of actuators. Each actuator may be associated with a finger of the turn-up device and may be configured to move the finger from a radially retracted position to a radially extended position.

In step (a) of such a method, the turn-up device may include a first plurality of fingers. The first plurality of fingers may be equally circumferentially spaced in a first finger pattern. Step (d) may further include radially adjusting a first finger pattern diameter of the first finger pattern.

In step (a) of such a method, the turn-up device may include a first plurality of fingers. The first plurality of fingers may be equally circumferentially spaced in a first finger pattern. Step (d) may further include repositioning the first plurality of fingers and adding a second plurality of fingers. The combined first and second pluralities of fingers may be equally circumferentially spaced in a second finger pattern. Step (d) may further include radially adjusting a second finger pattern diameter of the second finger pattern.

DETAILED DESCRIPTION OF THE INVENTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
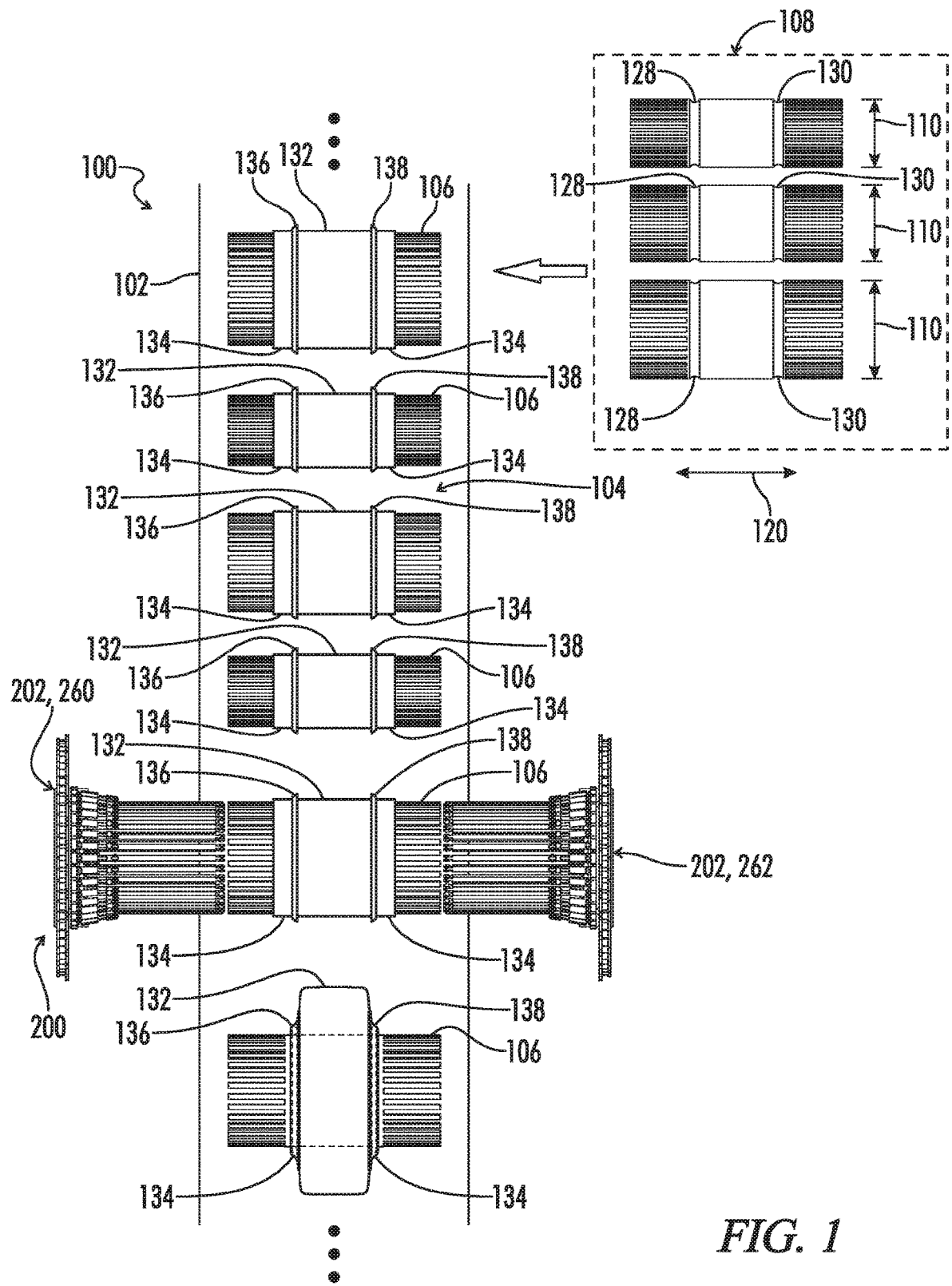
FIG. 1 is a schematic of a portion of a tire building production line in accordance with an embodiment of the present invention.

Referring to FIG. 1, a portion of a tire building production line 100 is shown. The tire building production line 100 may include a conveyer belt 102. The conveyer belt 102 may carry a lineup 104 of tire building drums 106. Although the tire building production line 100 is shown utilizing a conveyer belt 102, it should be appreciated that other means exist (e.g., rollers, dollies, wheeled cradles, or the like) for transporting tire building drums 106 between multiple building stations and may alternatively be utilized for such a purpose. Each tire building drum 106 of the lineup 104 may be a selected drum from a group of drums 108 having different drum diameters 110. The utilization of multiple simplified tire building drums 106 allows for a more streamlined tire building process which allows each tire building drum 106 to hold a tire assembly throughout multiple building stations on the tire building production line 100.

Figure 2:
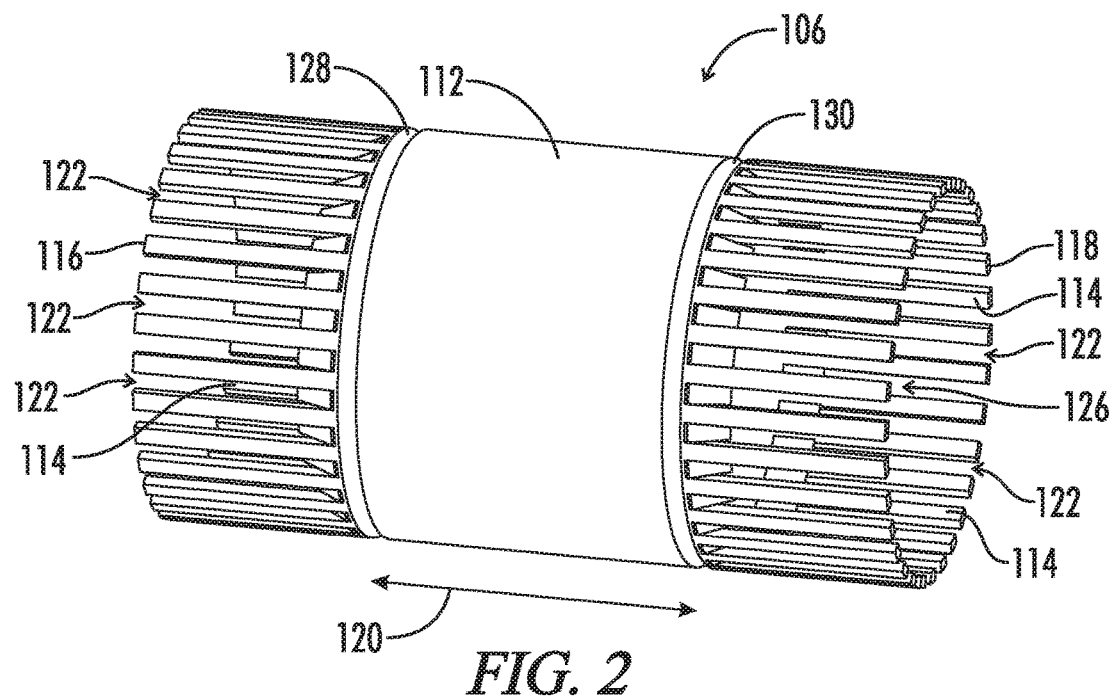
FIG. 2 is a side elevation view of tire building drum in accordance with an embodiment of the present invention.
Figure 3:
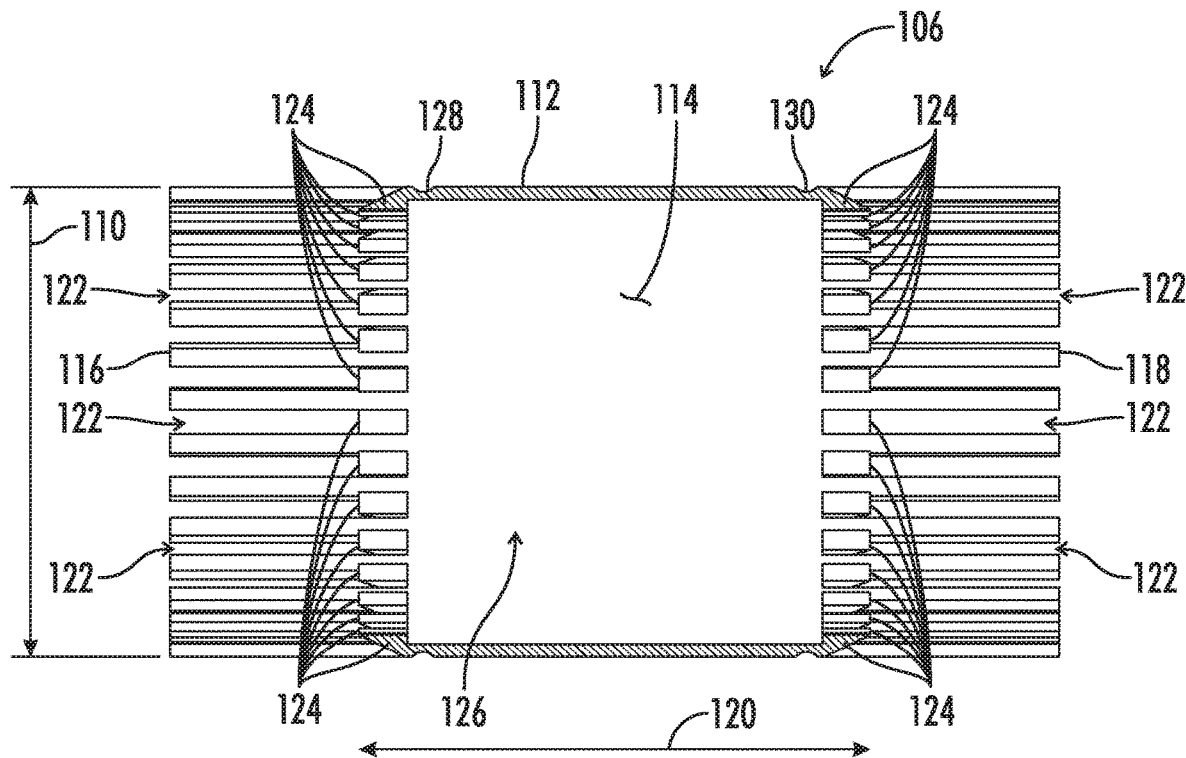
FIG. 3 is a cross-sectional view of the tire building drum of FIG. 2.

As can best be seen in in FIGS. 2 and 3, each tire building drum 106 may include a cylindrical outer drum surface 112, an inner drum surface 114, a first drum end 116, and a second drum end 118. The tire building drum 106 may further include a lengthwise direction 120 defined perpendicularly between the first drum end 116 and the second drum end 118. Each of the first and second drum ends 116, 118 include a plurality of guide slots 122 disposed between the outer drum surface 112 and the inner drum surface 114. The plurality of guide slots 122 may extend parallel to the lengthwise direction 120. Each of the guide slots 122 may be open either to its respective first drum end 116 or second drum end 118. The guide slots 122 may be equally circumferentially spaced around each drum end 116, 118.

As can best be seen in FIG. 3, each tire building drum 106 may further include a plurality of ramps 124. Each ramp 124 is associated with one of the guide slots 122. As illustrated, each ramp 124 may extend from the inner drum surface 114 proximate its respective guide slot 122. Each ramp 124 may extend into an internal drum area 126. The internal drum area 126 may include means (not shown) for interfacing with an external control mechanism (not shown) for positioning the tire building drum 106. The internal drum area 126 may be defined by the inner drum surface 114 between the first drum end 116 and the second drum 118. Alternatively, each ramp 124 may extend from its respective guide slot 122.

Each tire building drum 106 may include a first bead lock groove 128 and a second bead lock groove 130, which may be positioned circumferentially around the outer drum surface 112. The first bead lock groove 128 may be positioned adjacent to the guide slots 122 extending from the first drum end 116. The second bead lock groove 130 may be positioned adjacent to the guide slots 122 extending from the second drum end 118.

As can best be seen in FIG. 1, each tire building drum 106 of the lineup 104 may be wrapped with a tire carcass 132. The tire carcass 132 may be wrapped onto each respective tire building drum 106 at a station (not shown) located on the tire building production line 100. The tire carcass 132 may include two tire carcass edge portions 134 which extend partially over the guide slots 122 extending from the first drum end 116 and second drum end 118. Each tire building drum 106 may further carry a first bead 136 and a second bead 138. Each of the first and second beads 136, 138 may be positioned around the tire carcass 132. The first bead 136 may be positioned over the first bead lock groove 128. The second bead 138 may be positioned over the second bead lock groove 130. As the tire carcass 132 is shaped, the first and second beads 136, 138 may ensure that a finished tire diameter conforms to the drum diameter 110 of the tire building drum 106 on which a tire was formed.

The tire building production line 100 further includes a station comprising a tire building system 200. Each tire building drum 106 of the lineup 104 may proceed to the tire building system 200 to have the tire carcass edge portions 134 turned up before proceeding to another station (not shown) of the tire building production line 100. As can best be seen in FIGS. 1 and 4-6, the tire building system 200 may include a selected tire building drum 106 from the lineup 104 and a separable tire turn-up apparatus 202. The tire turn-up apparatus 202 may be referred to as a tire turn-up device 202 or a turn-up device 202. The tire turn-up apparatus 202 is completely external to the selected tire building drum 106. Each tire building drum 106 may simplified in that no internal mechanisms are needed to turn-up the tire carcass 132.

The tire turn-up apparatus 202 is configured to selectively engage and disengage the selected tire building drum 106. As can best be seen in FIGS. 4-6, the tire turn-up apparatus 202 includes a base 204 and a first plurality of finger assemblies 206. The base 204 may be centered on a longitudinal axis 208. Furthermore, the base 204 may be movable along the longitudinal axis 208 in order to engage and disengage the selected tire building drum 106. For example, the base 204 may be movable along the longitudinal axis 208 utilizing a rail system 209 as shown in FIGS. 15-21B in conjunction with a servo motor (not shown). It should be appreciated that one of ordinary skill in the art may utilize other means for moving the base along the longitudinal axis 208. The lengthwise direction 120 of the selected tire building drum 106 may be aligned with the longitudinal axis 208.

Figure 10:
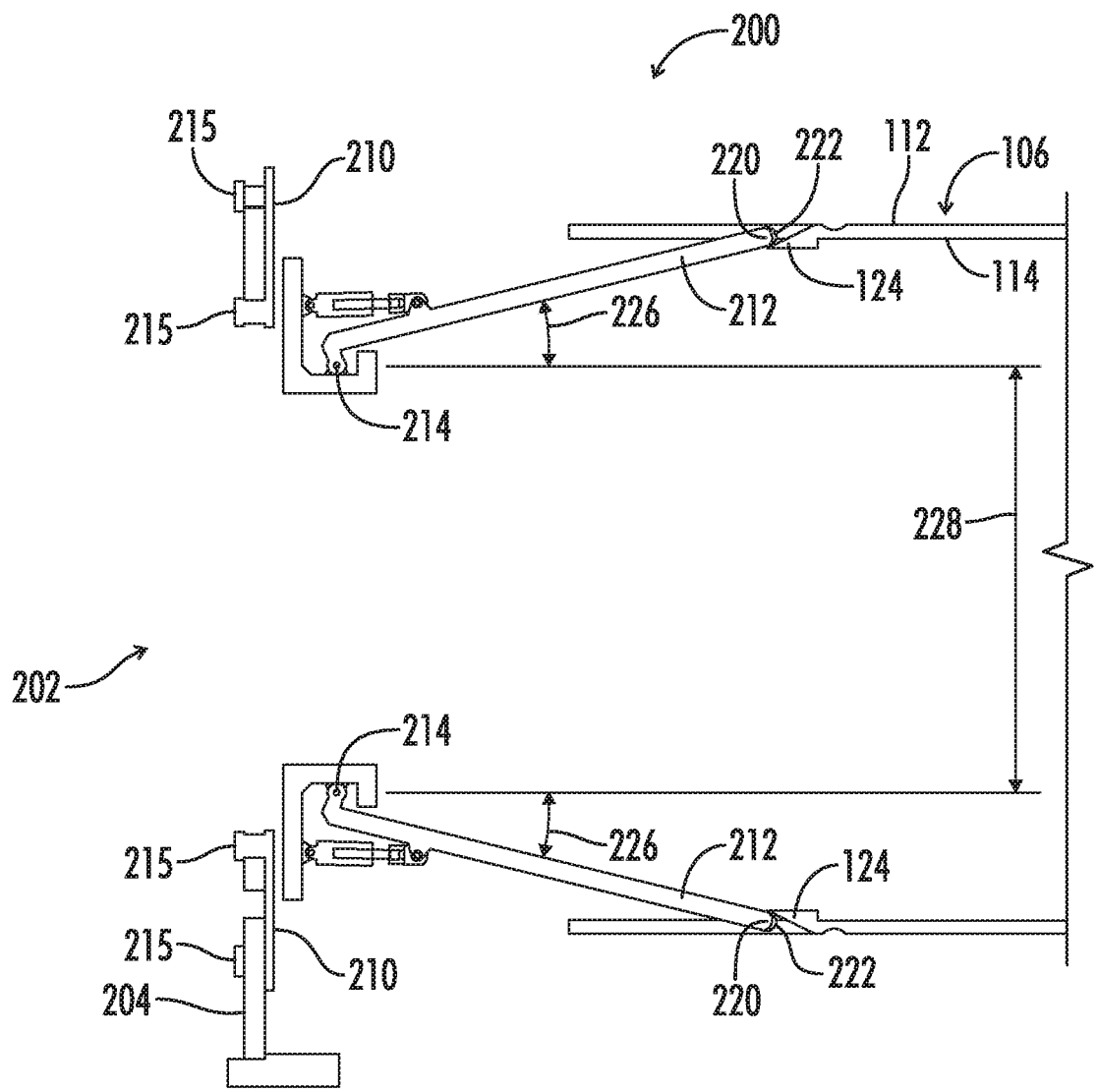
FIG. 10 is a schematic cross-section side elevational view of the tire turn-up apparatus of FIG. 9 in conjunction with the tire building drum.
Figure 11:
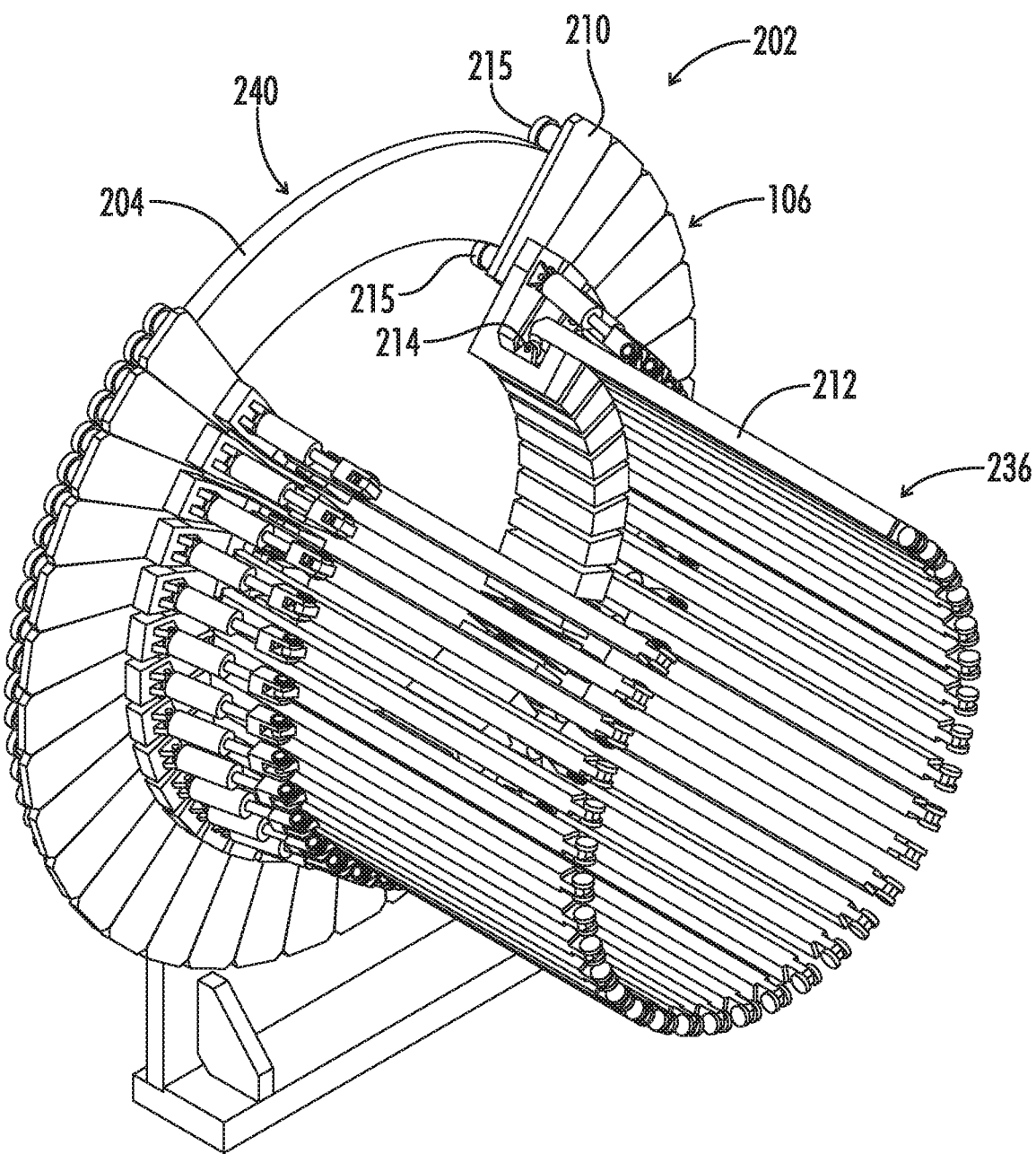
FIG. 11 is a perspective view of the tire turn-up apparatus of FIG. 7 having the first plurality of finger assemblies repositioned in a second configuration having at least one gap.

As can best be seen in FIGS. 10 and 11, each finger assembly 206 may include a backstop 210 connected to the base 204 and a finger 212 pivotally connected at a pivotal connection 214 to the backstop 210. Each backstop may include a plurality of cams 215. The plurality of cams 215 may be configured to hold the backstop 210 to the base 204. The plurality of cams 215 may further be configured to adjust the backstop 210 circumferentially on the base 204.

Figure 17:
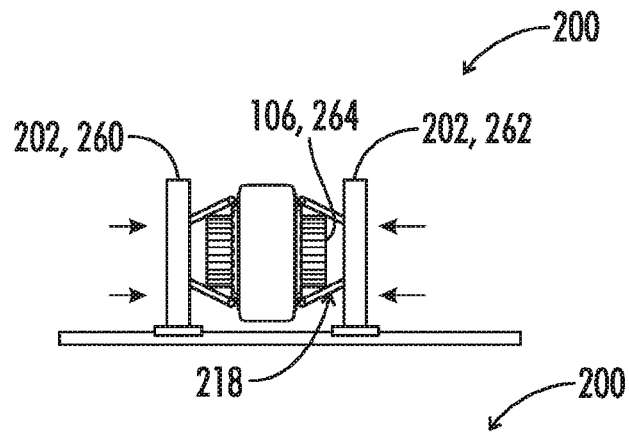
FIG. 17 is a side elevational view of the tire building system of FIG. 16 with the first plurality of fingers positioned in the radially extended position to turn-up an end of a first tire carcass wrapped around the first drum.
Figure 21A:
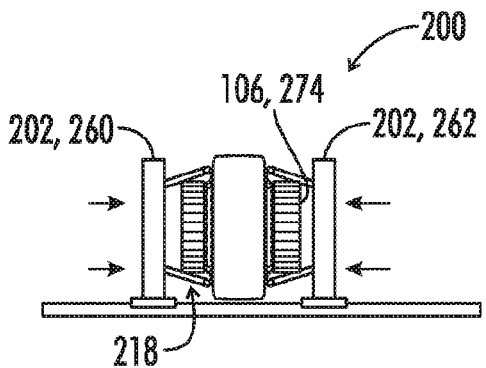
FIG. 21A is a side elevational view of the tire building system of FIG. 20A with the first plurality of finger assemblies positioned in the radially extended position to turn-up edge portions of a second tire carcass wrapped around the second drum.
Figure 21B:
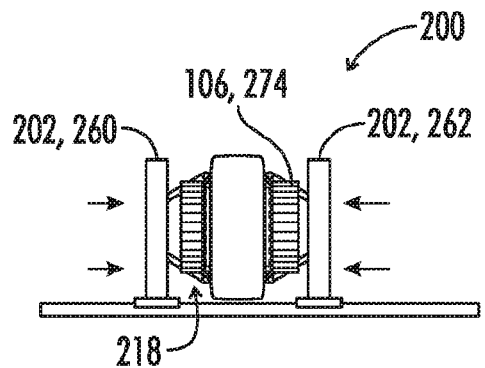
FIG. 21B is a side elevational view of the tire building system of FIG. 20B with the first plurality of finger assemblies positioned in the radially extended position to turn-up the edge portions of the second tire carcass.

Collectively the fingers 212 of the first plurality of finger assemblies 206 may be referred to as a first plurality of fingers 212. Each finger 212 of the first plurality of finger assemblies 206 may be positionable between a radially retracted position 216 (FIGS. 4-6) and a radially extended position 218 (FIGS. 17, 21A, and 21B). Each finger 212 of the first plurality of finger assemblies 206 may be configured to be received through one of the guide slots 122. Each finger 212 may have a free end 220 positioned distally from its respective pivotal connection 214. The free end 220 may include a roller 222 connected thereto. Each finger 212 of the first plurality of finger assemblies 206, when engaged with the tire building drum 106, works in unison to cause its respective free end 220 and associated roller 222 to turn-up the tire carcass edge portions 134 disposed on the tire building drum 106.

Figure 7:
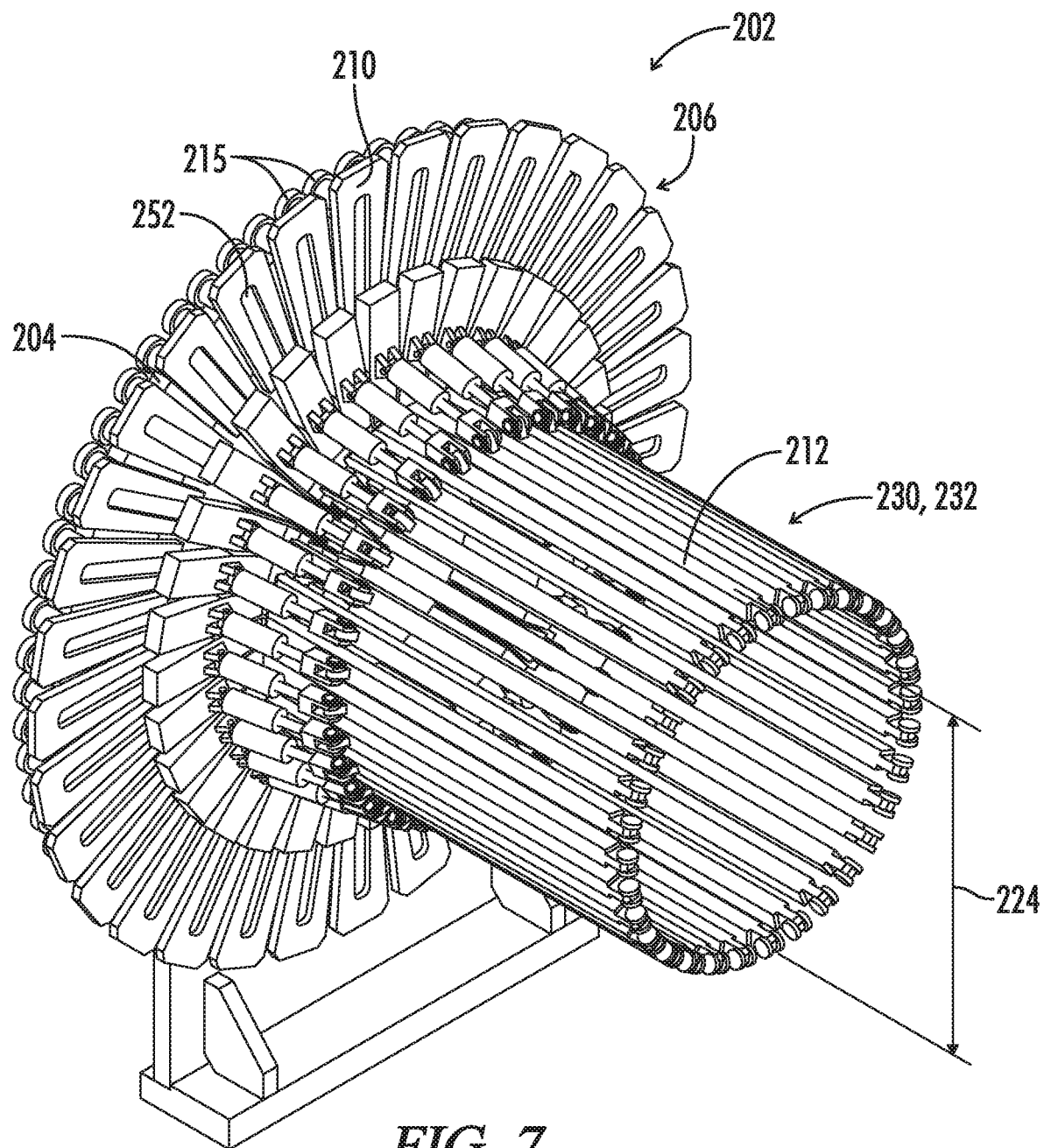
FIG. 7 is a perspective view of the tire turn-up apparatus having a first plurality of finger assemblies arranged in a first pattern in accordance with the present invention.
Figure 8:
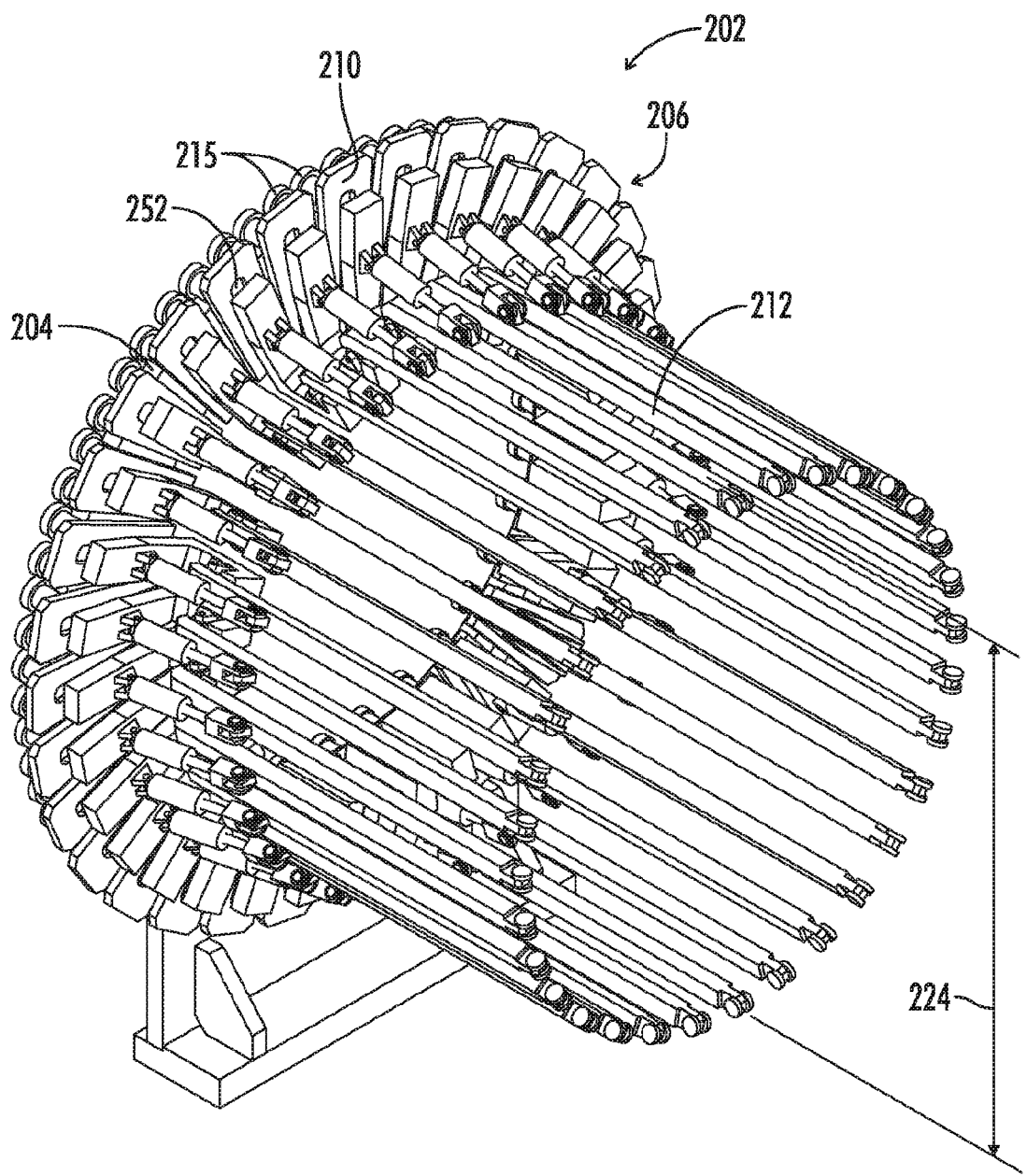
FIG. 8 is a perspective view of the tire turn-up apparatus of FIG. 7 having the first plurality of fingers arranged in the first pattern at a second diameter.

As can best be seen in FIGS. 7 and 8, the each finger 212 of the plurality of finger assemblies 206 may be oriented parallel to the longitudinal axis 208 when in the radially retracted position 216. The pivotal connection 214 of each finger 212 may be radially adjustable on its respective backstop 210 to define an adjustable finger pattern diameter 224. The adjustable finger pattern diameter 224 allows for each finger 212 to be adjusted in order to be compatible with different drum diameters 110 of the tire building drums 106 from the lineup 104. By radially adjusting the first plurality of fingers 212, the free end 220 of each finger 212 is positioned to align with its respective ramp 124. Additionally, as can best be seen in FIG. 10, the radially retracted position 216 of each finger 212 may be configured to adjust to an outwardly directed acute angle 226 relative to the longitudinal axis 208. The outwardly directed acute angle 226 allows for further adjustability to align the free end 220 of each finger 212 with its respective ramp 124. This is beneficial when the drum diameter 110 is larger than the largest finger diameter that the adjustable finger pattern diameter 224 can be adjusted to.

Figure 9:
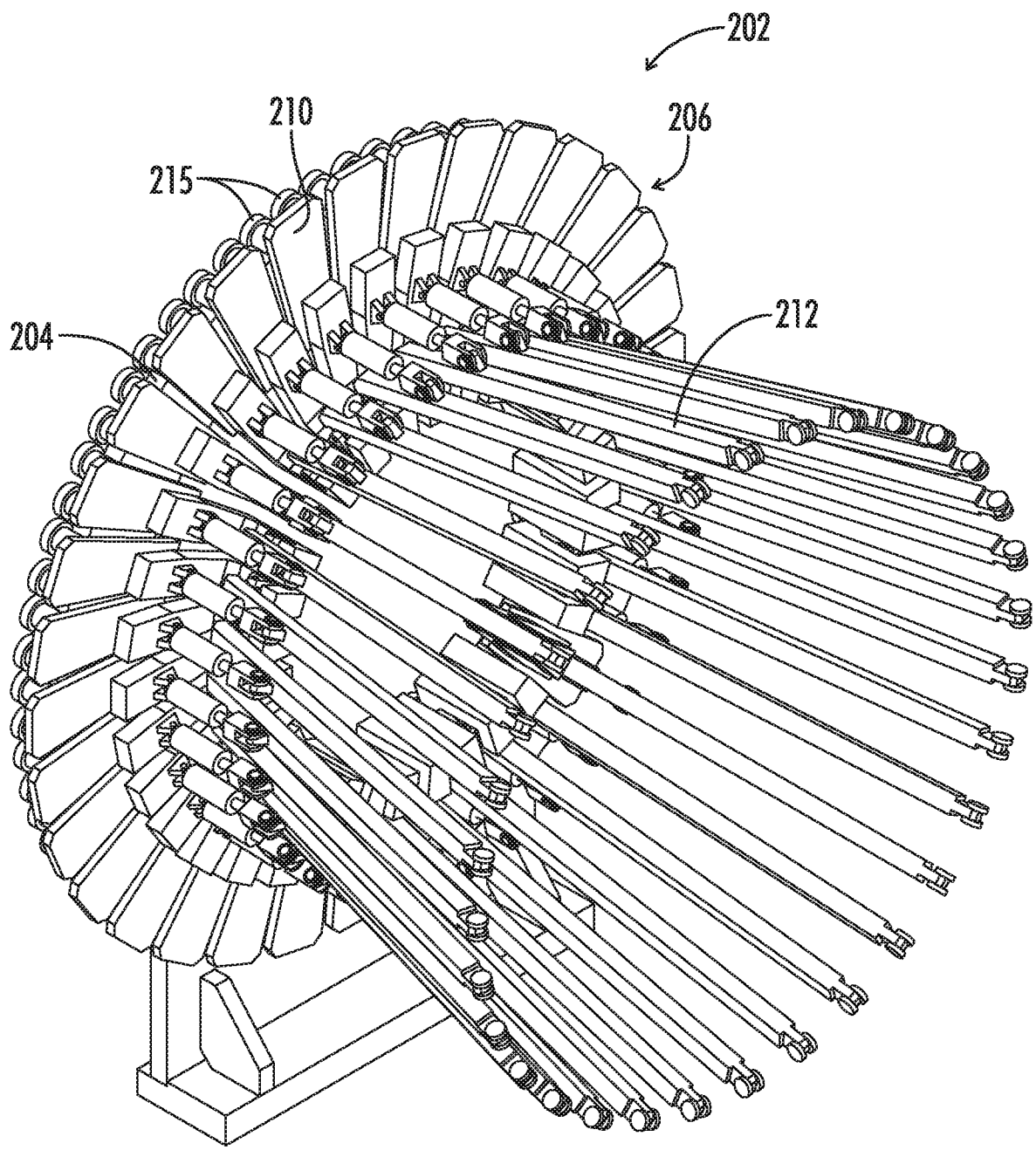
FIG. 9 is a perspective view of a tire turn-up apparatus having a first plurality of finger assemblies radially fixed on respective backstops in the radially retracted position adjusted to an outwardly directed acute angle in accordance with the present invention.

In an alternative embodiment as can best be seen in FIGS. 9 and 10, the pivotal connection 214 of each finger may be fixed on its respective backstop 210 to define a fixed finger pattern diameter 228. As can best be seen in FIG. 10, the radially retracted position 216 of each finger 212 may be configured to have the finger 212 oriented at the outwardly directed acute angle 226 relative to the longitudinal axis 208. The outwardly directed acute angle 226 may be selected based on the drum diameter 110 of the selected tire building drum 106. The outwardly directed acute angle 226 of each finger 212 in the radially retracted position 216 aligns the free end 220 of each finger 212 with its respective ramp 124.

As can best be seen in FIG. 7, the first plurality of finger assemblies 206 may have a first configuration 230 where finger assemblies 206 are equally circumferentially spaced in a first finger pattern 232. The first finger pattern 232 may be associated with a first finger diameter 234 (shown in FIG. 12A). The first finger diameter 234 may be referred to as a first finger pattern diameter 234. The tire turn-up apparatus 202 may be configured such that the first finger diameter is adjustable to correspond to an associated drum diameter 110.

As can best be seen in FIG. 11, the first plurality of fingers assemblies 206 may have a second configuration 236 where the finger assemblies 206 are repositioned from the first configuration 230 along the base 204 to allow insertion of a second plurality of finger assemblies 238 (schematically shown in FIGS. 12A-13C). The second configuration 236 of the first plurality of finger assemblies 106 may have at least one gap 240. The at least one gap 240 may be configured to receive the second plurality of finger assemblies 238.

Figure 12A:
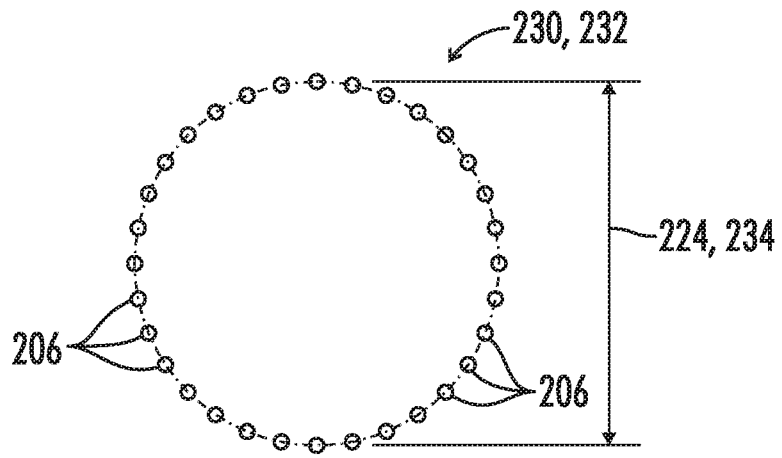
FIG. 12A is a diagram of the first pattern of FIG. 7.
Figure 12B:
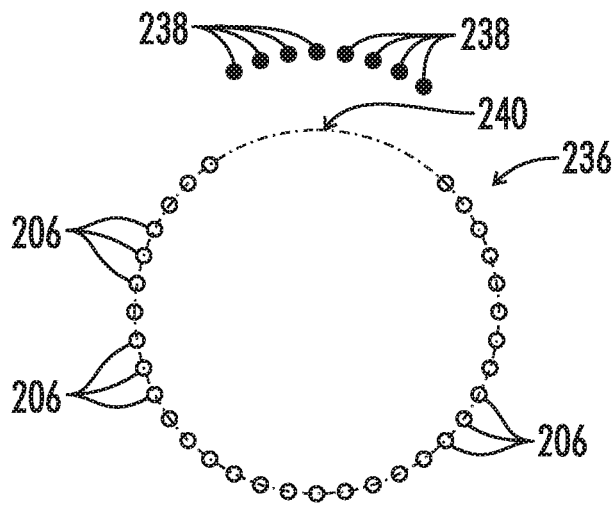
FIG. 12B is a diagram of the second configuration of FIG. 11 having the second plurality of finger assemblies overlaid above the at least one gap.
Figure 12C:
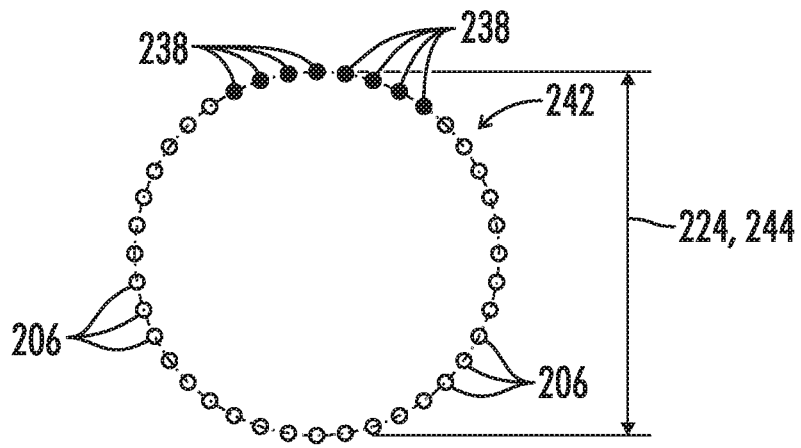
FIG. 12C is a diagram of a second finger pattern having the second plurality of fingers assemblies positioned in the at least one gap.
Figure 13A:
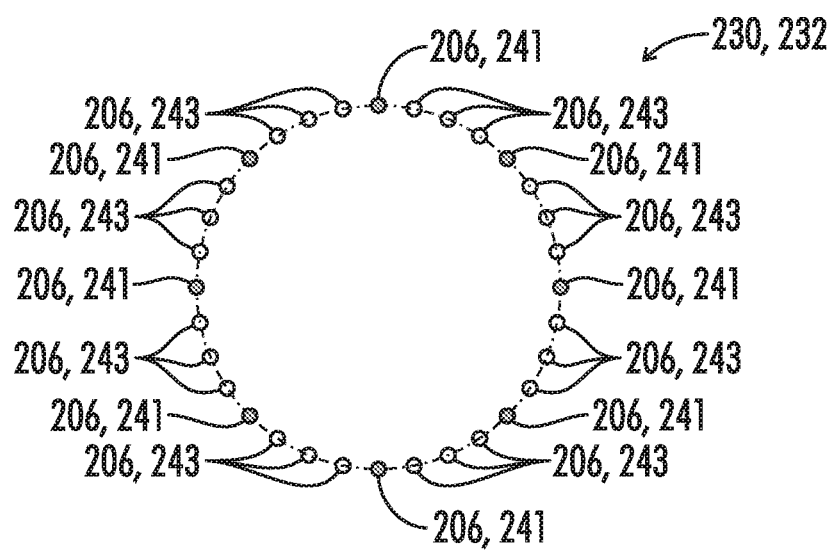
FIG. 13A is a diagram of the first pattern of FIG. 7 having specified fixed finger assemblies and non-fixed finger assemblies of the first plurality of finger assemblies.
Figure 13B:
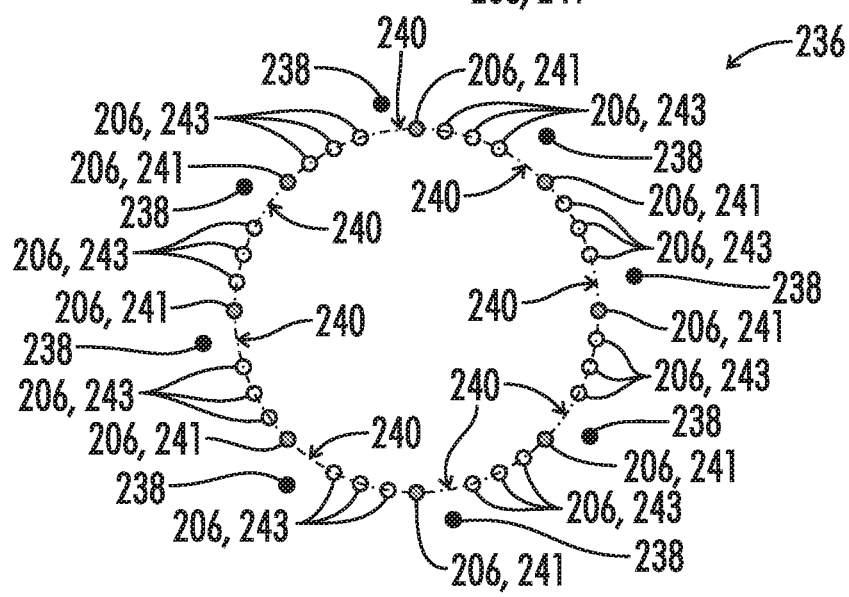
FIG. 13B is a diagram of an embodiment of a second configuration with the at least one gap having multiple gaps and having each second finger assembly of the second plurality of finger assemblies overlaid above a respective gap of the multiple gaps.
Figure 13C:
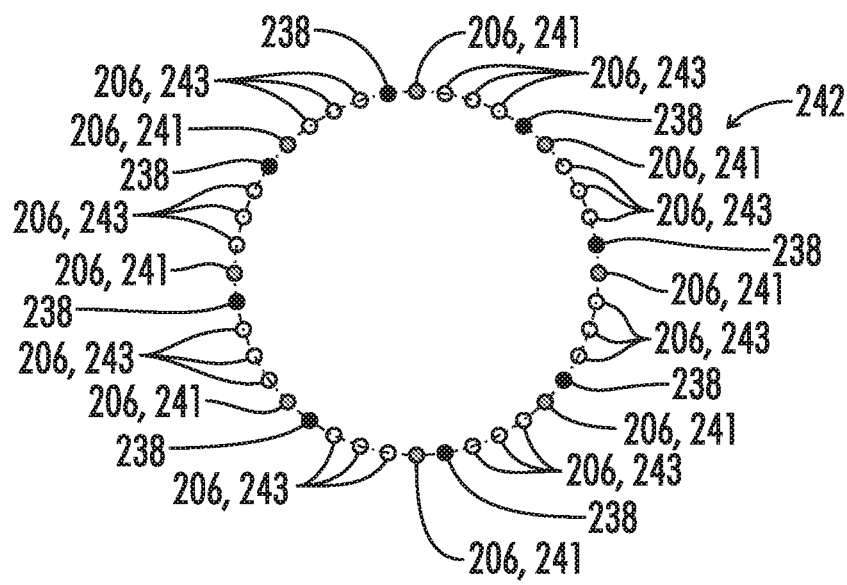
FIG. 13C is a diagram of a second finger pattern having each second finger assembly of the second plurality of finger assemblies positioned in a respective gap of the multiple gaps.

As shown in FIGS. 12C and 13C, in the second configuration 236, the combined first plurality of finger assemblies 206 and second plurality of finger assemblies 238 are equally circumferentially spaced in a second finger pattern 242. The second finger pattern may be associated with a second finger diameter 244. The second finger diameter 244 may be referred to as a second finger pattern diameter 244. The second finger diameter 244 may be larger than the first finger diameter 234. Tire building drums 106 with larger drum diameters 110 may have more guide slots 122 associated with the first and second drum ends 116, 118 and thus require the use of both the first and second pluralities of finger assemblies 206, 238. Each finger assembly of the second plurality of finger assemblies 138 may be identical to each finger assembly of the first plurality of finger assemblies 206.

As can best be seen by comparing FIG. 12A to FIG. 12B, the first plurality of finger assemblies 106 may be repositioned from the first configuration 230 to make room for the second plurality of finger assemblies 238. As can best be seen in FIG. 12B, the at least one gap 240 may be one large gap configured to receive the second plurality of finger assemblies 238. As can best be seen in FIG. 13B, the at least one gap 240 may include multiple gaps equally circumferentially spaced around the base 204. The first plurality of finger assemblies 106 may include fixed finger assemblies 241 and non-fixed finger assemblies 243. As can best be seen by comparing FIG. 13A to FIG. 13B, the non-fixed finger assemblies 243 of the first plurality of finger assemblies 106 may move either clockwise or counterclockwise toward the fixed finger assemblies 241 in order to create the gaps 240 for receiving the second plurality of finger assemblies 238.

Figure 14:
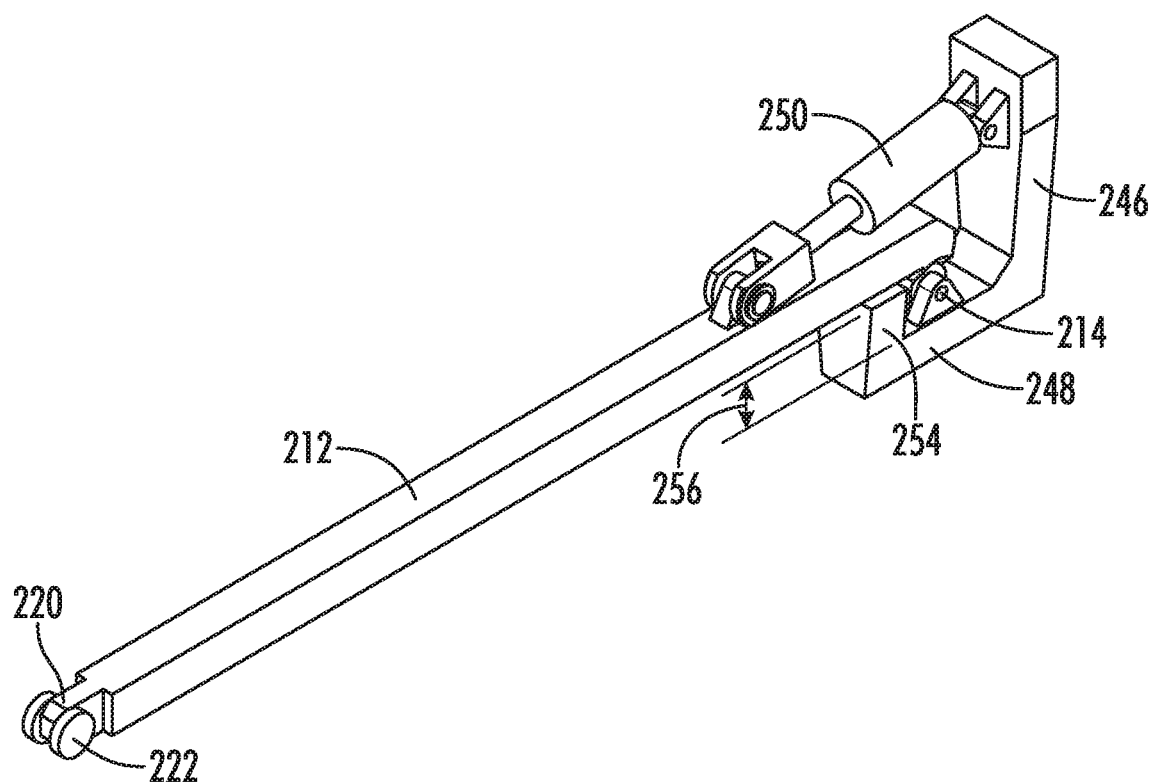
FIG. 14 is a perspective view of a finger assembly of FIG. 4 in accordance with the present invention.
Figure 15:
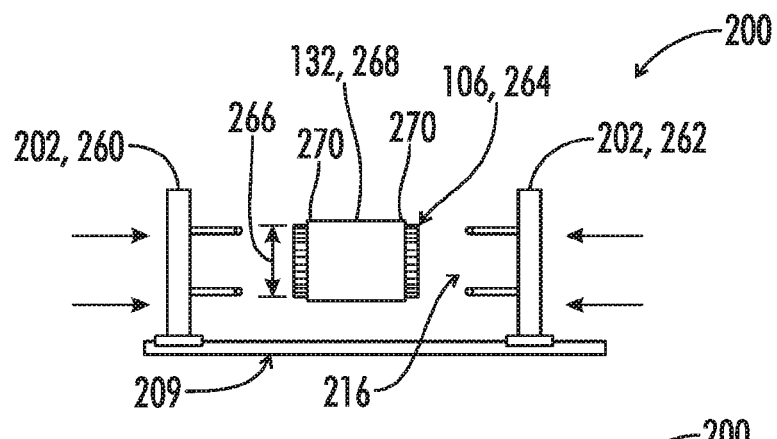
FIG. 15 is a side elevational view of the tire building system of FIG. 4 having the tire turn-up apparatus disengaged from a first drum of a first diameter.

As can best be seen in FIG. 14, each finger assembly of the first and second pluralities of finger assemblies 206, 238 may further include a rail 246, a stop plate 248, and an actuator 250. The rail 246 may be positioned parallel to the backstop. The rail 246 may be connected between its respective finger 212 and its respective backstop 210. The rail 246 may be configured to conform to either the adjustable finger pattern diameter 224 or the fixed finger pattern diameter 228. As can best be seen in FIGS. 4-8, each backstop 210 when configured in accordance with the adjustable finger pattern diameter 224 may include a rail opening 252. The rail opening 252 of each respective backstop 210 may be configured to connect to the rail 246. Each rail 246 may be adjustable radially when attached to the rail opening 252 of its respective backstop 210. The rail opening 252 may house a linear rail system (not shown) or the like in order to radially adjust its associated rail 246.

The stop plate 248 extends from a lower edge of the rail 246 nearest the longitudinal axis 208. The stop plate may include a finger stop 254 positioned near a distal end of the stop plate 248 relative to the rail 246. As can best be seen in FIG. 14, the finger stop 254 is fixed and ensures that the finger 212 when in the radially retracted positioned 216 is parallel to the longitudinal axis 208. As can best be seen in FIG. 14, the finger stop 254 may be adjustable and have an adjustable height 256. The height 256 of the finger stop 254 may be configured to control the outwardly directed acute angle 226 of each finger 212 when in the radially retracted positioned 216. The height 256 may be adjusted using an electric piston, screw jack, scissor jack or the like. Alternatively, the outwardly directed acute angle 226 may be controlled using the actuator 250.

The actuator 250 when configured in accordance with the adjustable finger pattern diameter 224 may be connected between its respective finger 212 and its respective rail 246. The actuator 250 when configured in accordance with the fixed finger pattern diameter 228 may be connected between its respective finger 212 and its backstop 210. The actuator 250 may be pivotally attached at both its ends. The actuator 250 may be configured to move its respective finger 212 between the radially retracted position 216 and the radially extended position 218. Alternatively, the actuator 250 may be biased to only return its respective finger 212 to the radially retracted position 216 from the radially extended position 218. In this alternate scenario, each finger 212 may move to the radially extended position 218 by moving the tire turn-up apparatus 202 along the longitudinal axis 208 to engage the free end 220 and roller 222 of each finger 212 with its respective ramp 124 and the tire carcass 132. Each ramp 124 may guide the movement of each finger 212 between the radially retracted position 216 and the radially extended position 218. The actuator 250 may be a hydraulic cylinder, a pneumatic cylinder, an electric solenoid or the like.

Figure 4:
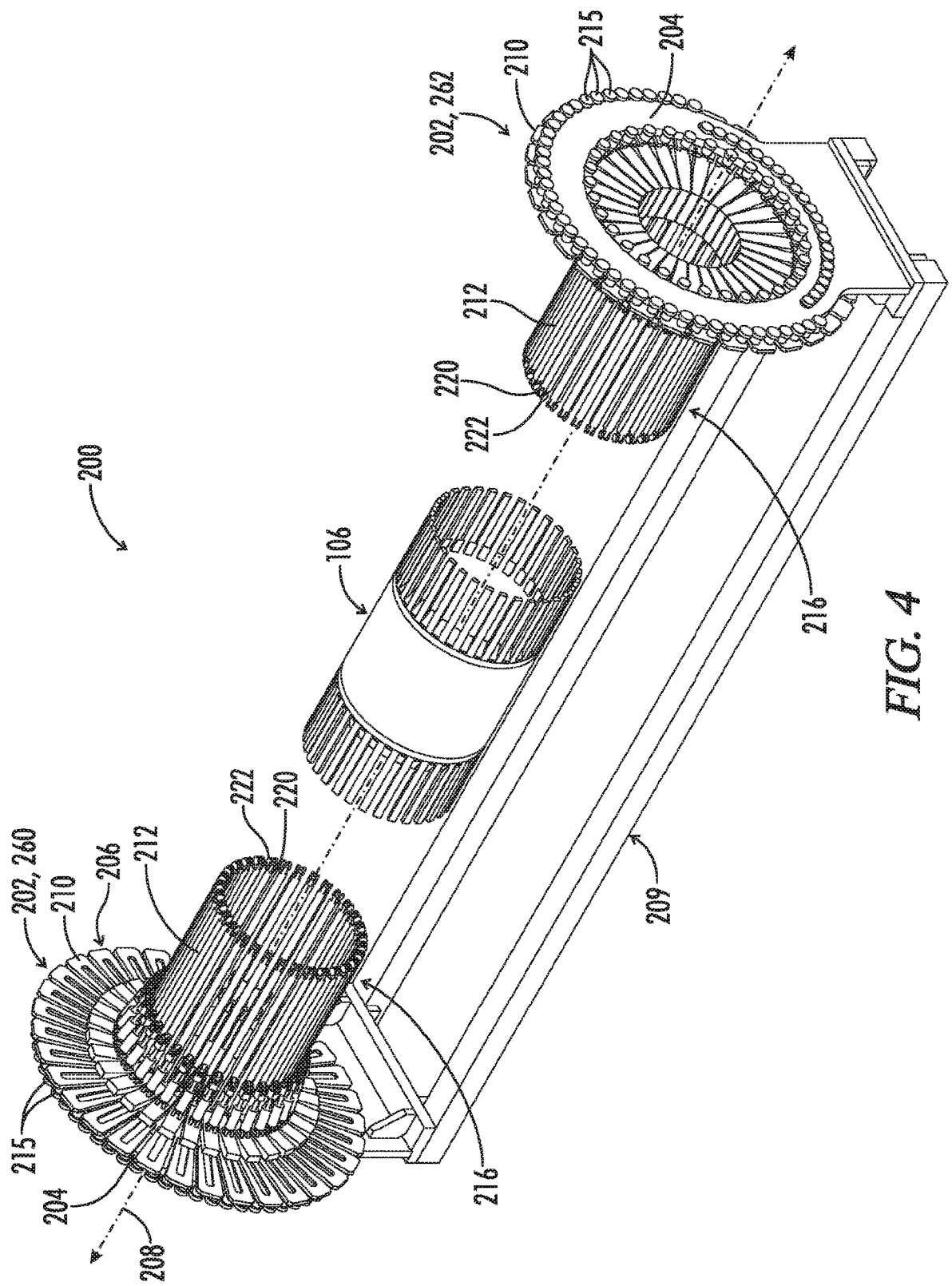
FIG. 4 is a perspective view of a tire building system with a tire turn-up apparatus disengaged from each end of a tire building drum in accordance with an embodiment of the present invention.
Figure 5:
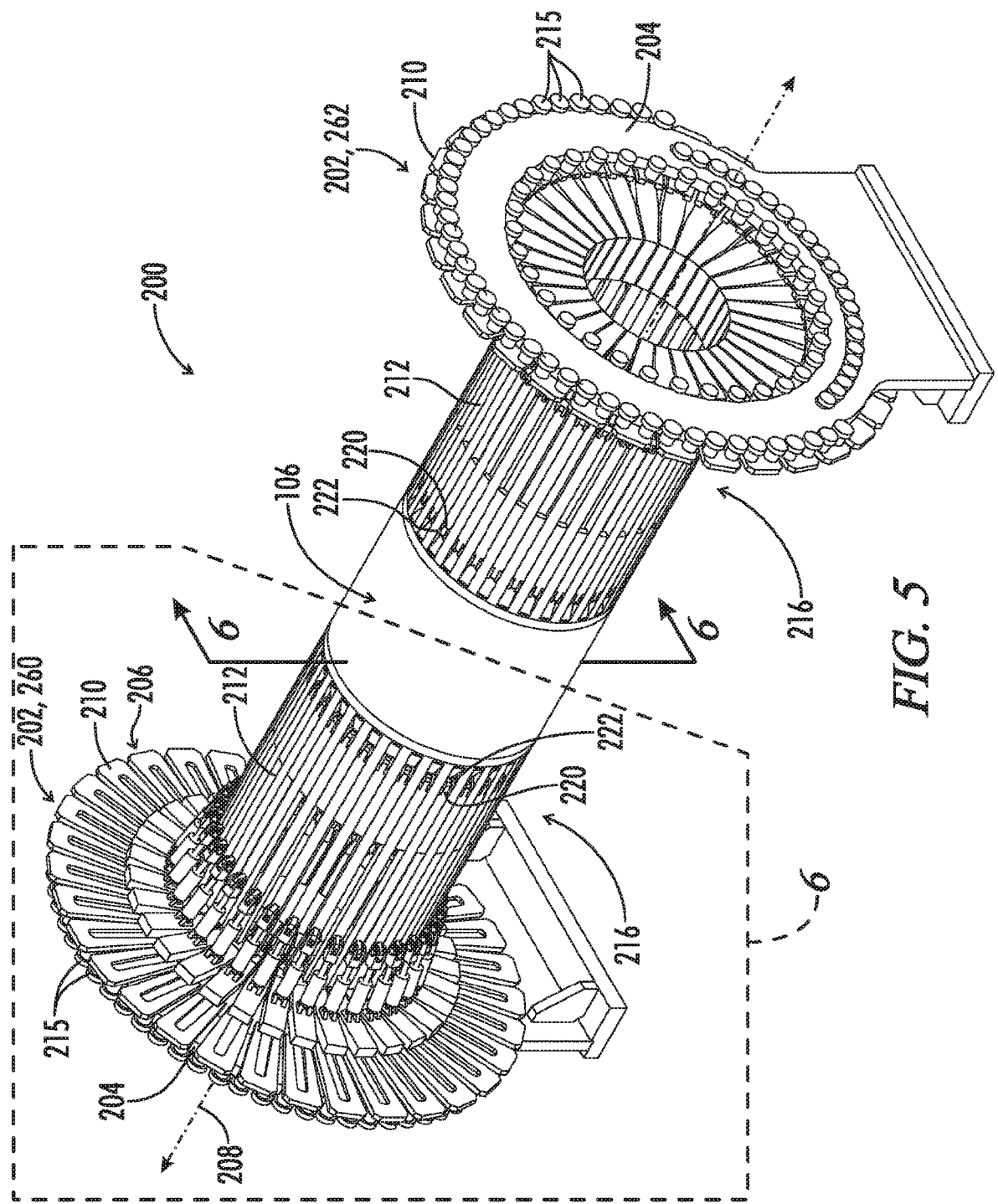
FIG. 5 is a perspective view of the tire building system of FIG. 4 with the tire turn-up apparatus engaged with the tire building drum and having fingers arranged in a radially retracted position.
Figure 6:
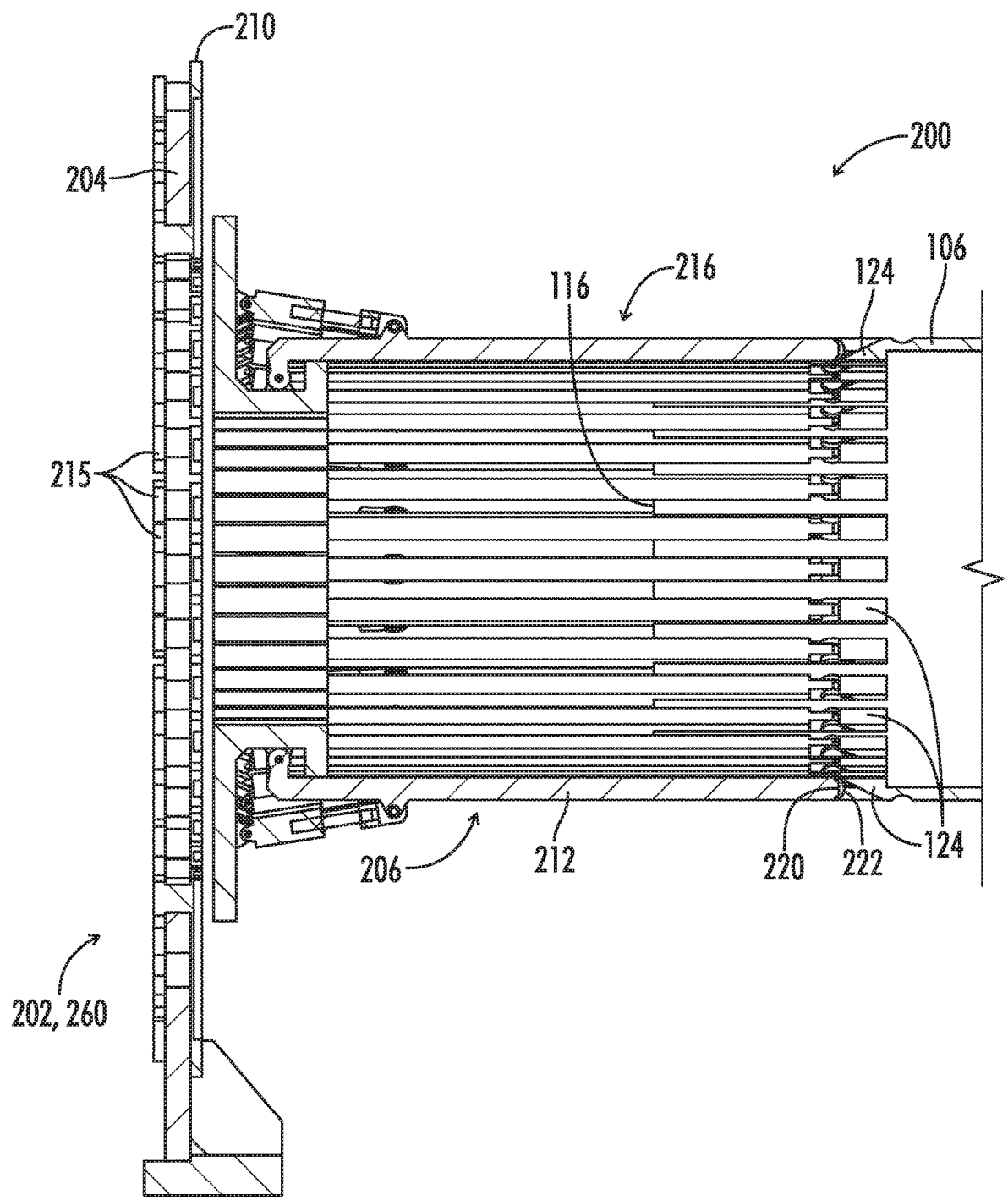
FIG. 6 is an enlarged schematic cross-sectional view of the tire building system of FIG. 5.

Referring back to the tire building system 200 as shown in FIG. 4, the tire building drum 106 is disengaged from the tire turn-up apparatus 202. The tire building drum 106 is positioned between a first tire turn-up apparatus 260 and a second tire turn-up apparatus 262. Each of the first and second tire turn-up apparatuses 260, 262 may be identical and include all of the features from the tire turn-up apparatus 202, described above. The first and second tire turn-up apparatuses 260, 262 are positioned facing one another with respective fingers 212 extending toward the tire building drum 106. The first and second tire turn-up apparatuses 260, 262 may both be aligned on the longitudinal axis 208. The lengthwise direction 120 of the tire building drum 106 may be aligned with the longitudinal axis 208. The first and second tire turn-up apparatuses 260, 262 may be operated simultaneously upon the tire building drum 106 to turn-up both tire carcass edge portions 134. As can best be seen in FIG. 5, the tire building drum 106 is engaged with the first tire turn-up apparatus 260 and the second tire turn-up apparatus 262. Each finger 212 of the first and second tire turn-up apparatuses 260, 262 are positioned in the radially retracted position. As can best be seen in FIG. 6, each finger 212 of the first tire turn-up apparatus 260 is positioned in the radially retracted position 216 and is engaged with its respective ramp 124. Each finger 212 of the first tire turn-up apparatus 260 is positioned in the internal drum area 126 directly below its respective guide slot 122. Alternatively, each finger 212 of the first tire turn-up apparatus 222 may be positioned directly between the guide slots 122 (not shown) as the first tire turn-up apparatus engages the tire building drum 106. The ramps 124 help ensure that each finger 212 engages the tire carcass 132 at the correct location for turning the tire carcass edge portions 134 up. As can best be seen in FIGS. 17, 21A, and 21B, each finger 212 of the first and second tire turn-up apparatuses 260, 262 is positioned in the radially extended position 218.

Referring to FIGS. 15-21B, schematic diagrams of the tire building system 200 for turning up the tire carcass edge portions 134 of a tire carcass 132 disposed on a tire building drum 106 are shown. As can best be seen in FIG. 15, the tire building system 200 includes the first and second turn-up apparatuses 260, 262 disengaged from a first tire building drum 264 having a first drum diameter 266. The first tire building drum 264 may be one of the tire building drums 106 of the lineup 104. The first tire building drum 264 may include a first tire carcass 268 wrapped thereon. The first tire carcass 268 may include first tire carcass edge portions 270 extending partially over the guide slots 122 of the first tire building drum 264. The tire building system 200 may align the plurality of guide slots 122 of the first tire building drum 264 with the respective fingers 212 of the first and second tire turn-up apparatuses 260, 262.

Figure 16:
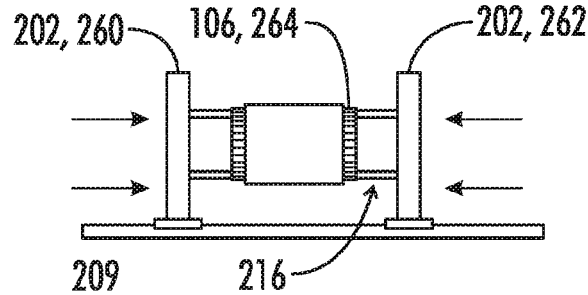
FIG. 16 is a side elevational view of the tire building system of FIG. 15 having the tire turn-up apparatus engaged with the first drum.

As can best be seen in FIG. 16, the first and second tire turn-up apparatuses 260, 262 are engaged with the first tire building drum 264. The first and second tire turn-up apparatuses 260, 262 may be moved towards one another along the longitudinal axis 208, which is aligned parallel with the lengthwise direction 120, to allow the respective fingers 212 to engage the ramps 124 of the first tire building drum 264. The respective fingers 212 of the first and second tire turn-up apparatuses 260, 262 are shown positioned in the radially retracted position 216.

As can best be seen in FIG. 17, the first tire carcass edge portions 270 are turned up by simultaneously (1) moving the respective fingers 212 of the first and second tire turn-up apparatuses 260, 262 from the radially retracted position 216 to the radially extended position 218 and (2) moving the first and second tire turn-up apparatuses 260, 262 toward one another. Each actuator 250 may be associated with each finger 212 and may be actuated in order to move each finger 212 from the radially retracted position 216 to the radially extended position 218 in order to turn the first tire carcass edge portions 270 up. The first tire carcass edge portions 270 may be turned up around the first and second beads 136, 138. The fingers 212 of the first and second tire turn-up apparatuses 260, 262 are shown in the radially extended position 218. The first tire carcass 268 is shown on the first tire building drum 264 in a turned up configuration 272.

Figure 18:
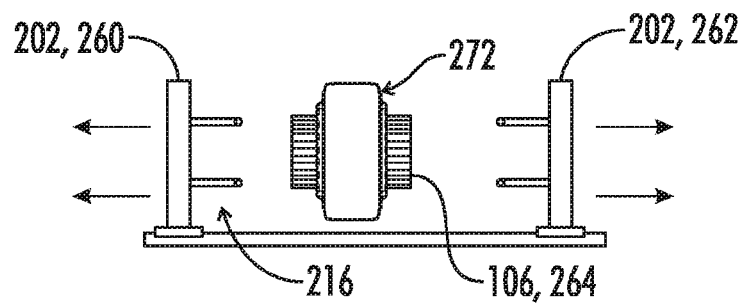
FIG. 18 is a side elevational view of the tire building system of FIG. 17 having the tire turn-up apparatus disengaged from the first drum with turned-up carcass ends.

As can best be seen in FIG. 18, the first and second tire turn-up apparatuses 260, 262 are disengaged from the first tire building drum 264 having the first tire carcass 268 in the turned up configuration 272. The respective fingers 212 of the first and second tire turn-up apparatuses 260, 262 may be returned to the radially retracted positioned 216 in order to disengage the first and second tire turn-up apparatuses 260, 262 from the first tire building drum 264.

Figure 19A:
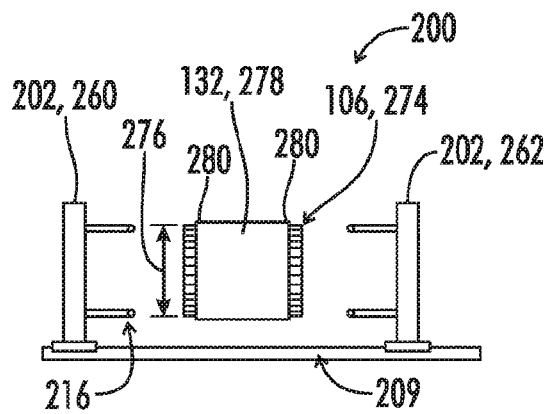
FIG. 19A is a side elevational view of the tire building system of FIG. 18 having a diameter of the first plurality of finger assemblies radially adjusted.
Figure 19B:
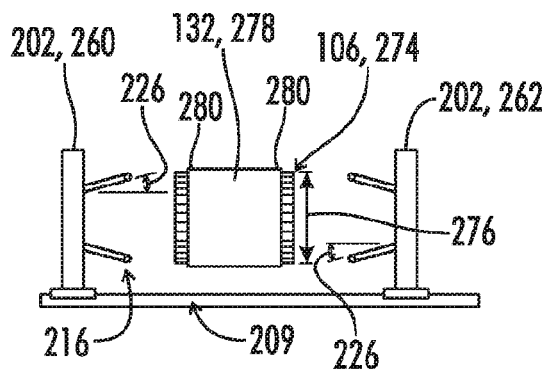
FIG. 19B is a side elevational view of the tire building system of FIG. 18 having the radially retracted position of the first plurality of finger assemblies adjusted to the outwardly directed acute angle.

Referring to FIGS. 19A and 19B, the first tire building drum 264 may be replaced with a second tire building drum 274. The second tire building drum 274 is shown disengaged from the first and second tire turn-up apparatuses 260, 262. The second tire building drum 274 may have a second drum diameter 276 larger than the first drum diameter 266. The second tire building drum 274 may be one of the tire building drums 106 of the lineup 104. The second tire building drum 274 may include a second tire carcass 278 wrapped thereon. The second tire carcass 278 may include second tire carcass edge portions 280 extending partially over the guide slots 122 of the second tire building drum 274. As can best be seen in FIG. 19A, the adjustable finger pattern diameter 224 of the first and second tire turn-up apparatuses 260, 262 may be adjusted so that each finger 212 may be positioned proximate its respective guide slot 122 and ramp 124 when engaged with the second tire building drum 274. As can best be seen in FIG. 19B, the radially retracted position 216 of each finger 212 may be adjusted to an outwardly directed acute angle 226 to position the free end 220 and associated roller 222 of each finger 212 in alignment with its respective ramp 124.

Figure 20A:
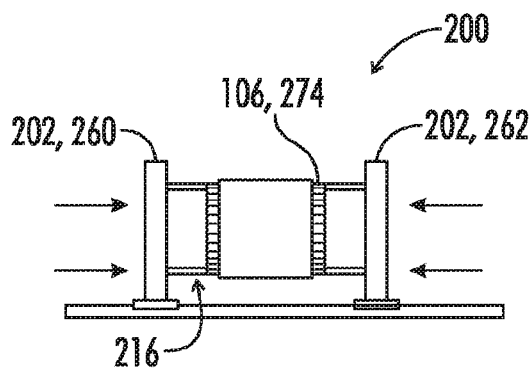
FIG. 20A is a side elevational view of the tire building system of FIG. 19A having the radially adjusted first plurality of finger assemblies engaged with a second drum of a second diameter.
Figure 20B:
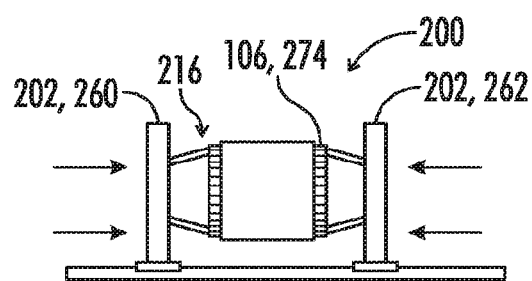
FIG. 20B is a side elevational view of the tire building system of FIG. 19B having the adjusted radially retracted position of the first plurality of finger assemblies engaged with the second drum of the second diameter.

Referring to FIGS. 20A and 20B, the first and second tire turn-up apparatuses 260, 262 are shown engaged with the second tire building drum 274. The first and second tire turn-up apparatuses 260, 262 may be moved toward one another along the longitudinal axis 208 to allow the respective fingers 212 to engage the ramps 124 of the second tire building drum 274. As can best be seen in FIG. 20A, the fingers 212 of the first and second tire turn-up apparatuses 260, 262 are shown positioned in the radially retracted position 216 with respective fingers 212 positioned parallel to the longitudinal axis 208. As can best be seen in FIG. 20B, the fingers 212 of the first and second tire turn-up apparatuses 260, 262 are shown positioned in the radially retracted position 216 with respective fingers 212 positioned at the outwardly directed acute angle 226.

Referring to FIGS. 21A and 21B, the second tire carcass edge portions 280 may be turned up by simultaneously (1) moving the respective fingers 212 of the first and second tire turn-up apparatuses 260, 262 from the radially retracted position 216 to the radially extended position 218 and (2) moving the first and second tire turn-up apparatuses 260, 262 toward one another. Each actuator 250 may be associated with each finger 212 and may be actuated in order to move each finger 212 from the radially retracted position 216 to the radially extended position 218 in order to turn the second tire carcass edge portions 280 up. The fingers 212 of the first and second tire turn-up apparatuses 260, 262 are shown in the radially extended position 218. The second tire carcass 278 is shown on the second tire building drum 264 in a turned-up configuration 272.

In certain embodiments, the tire building system 200 may include spacer plates. The spacer plates (not shown) may be positioned between each backstop 210 in order to insure proper and uniform spacing.

Figure 22:
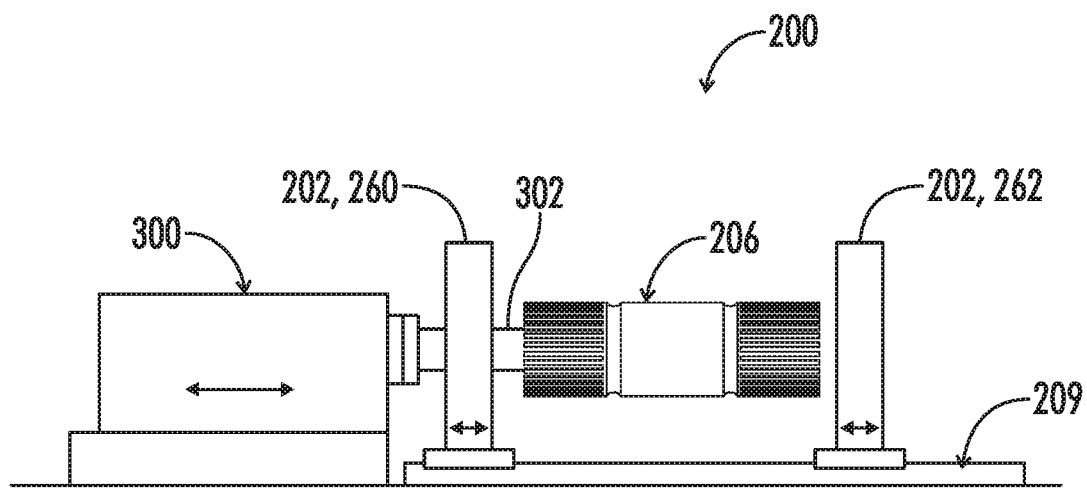
FIG. 22 is a side elevational view of the tire building system of FIG. 4 without the first plurality of finger assemblies and having a headstock engaged with the tire building drum.

Referring to FIG. 22, a headstock 300 for interfacing with the tire building drum 106 of the tire building system 200 is shown. The headstock 300 may include a headstock arm 302 extending therefrom. The headstock arm 302 may be oriented parallel to both the lengthwise direction 120 and the longitudinal axis 208. The headstock 300 may pass through the base 204 in order to engage the tire building drum 106. The drum 106 may be loaded onto the headstock 300 before positioning the tire building drum 106 between the first and second tire turn-up apparatuses 260, 262. Alternatively, the drum 106 may be loaded onto the headstock 300 after the end of the headstock 300 is positioned between the first and second tire turn-up apparatuses 260, 262.

Figure 23A:
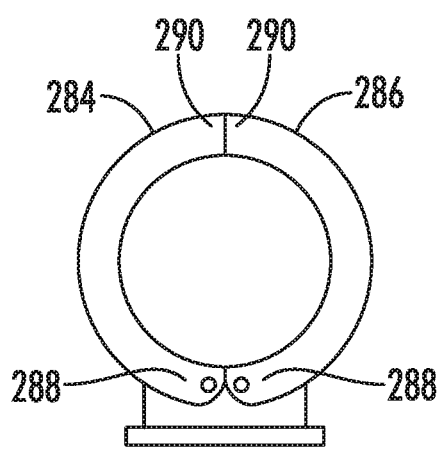
FIG. 23A is a front view of a base of a tire turn-up apparatus having a first base half and a second base half in accordance with the present invention.
Figure 23B:
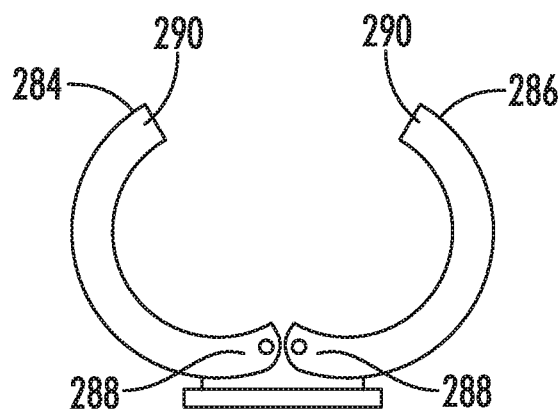
FIG. 23B is a front view of the base of FIG. 23A having the first and second base halves hinged open.

Referring to FIGS. 23A and 23B, the base 204 of the tire building system 200 is shown. The base 204 may include a first base half 284 and a second base half 286. The first and second base halves 284, 286 may include respective lower ends 288 pivotally connected. The first and second base halves 284, 286 may include respective upper ends 290 which hinge open (FIG. 23B) and hinge closed (FIG. 23A). The pivotally connected first and second base halves 284, 286 allow the headstock 300 and tire building drum 106 to be positioned between the first and second tire turn-up apparatuses 260, 262. It should be appreciated by one of ordinary skill in the art that this is one method of positioning the tire building drum 106 between the first and second tire turn-up apparatuses 260, 262 and that many other alternatives exist.

Figure 24A:
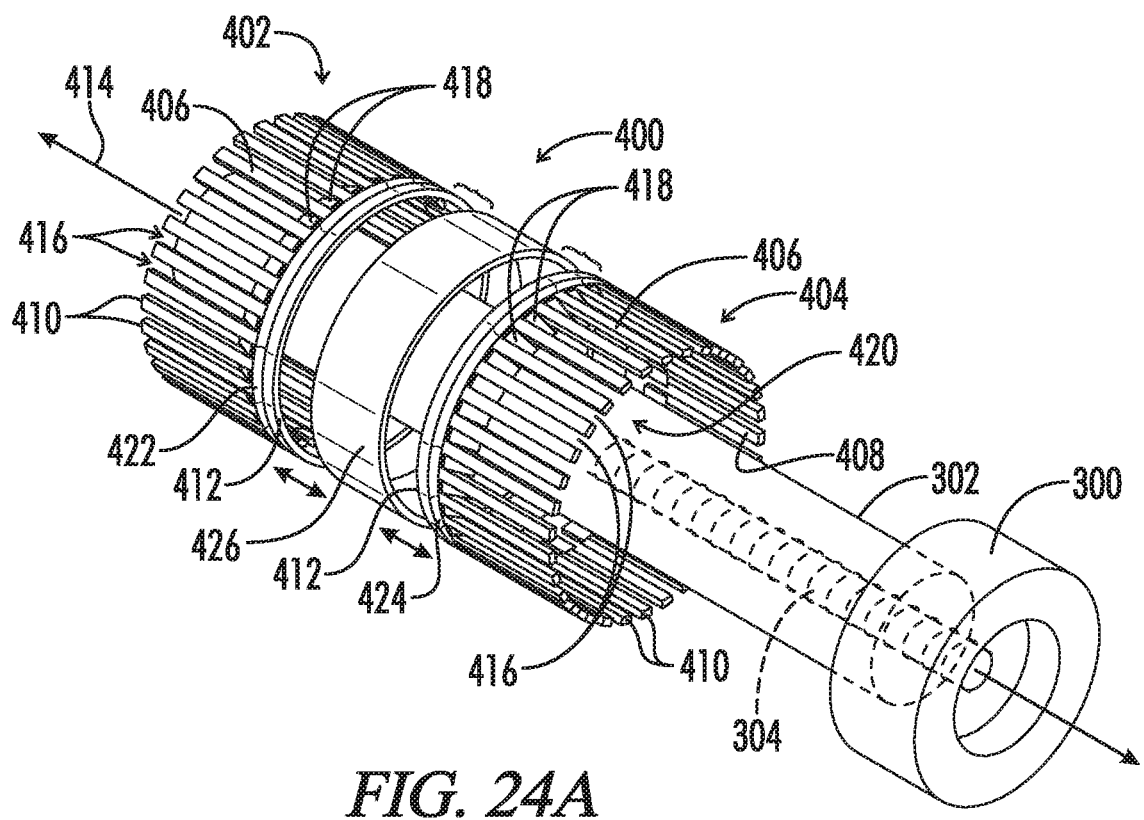
FIG. 24A is a perspective view of an embodiment of a tire building drum having a support ring with first and second drum halves spaced apart from the support ring in accordance with an embodiment of the present invention.
Figure 24B:
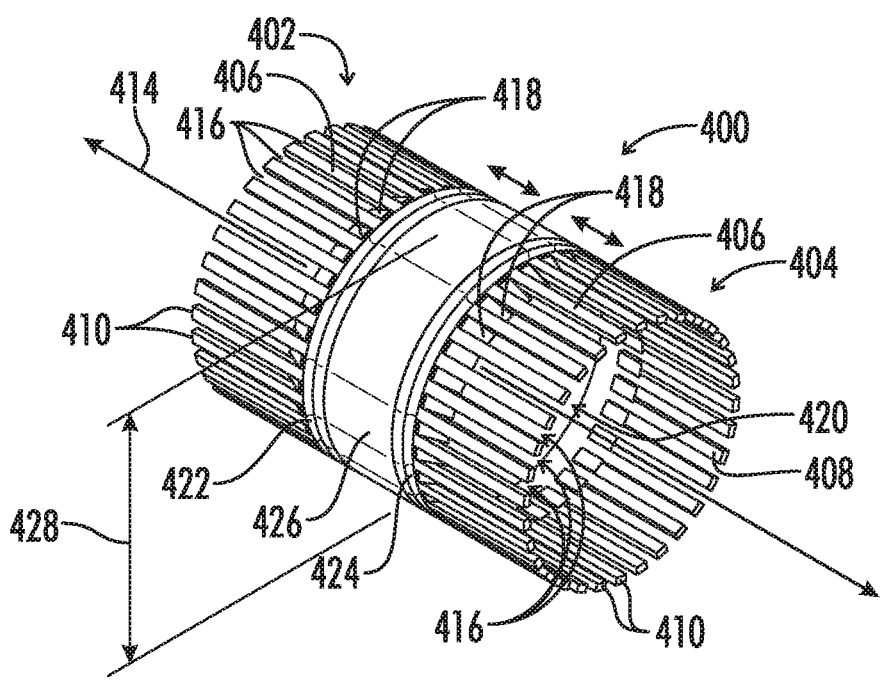
FIG. 24B is a perspective view of the tire building drum of FIG. 24A with the first and second drum halves in contact with the support ring in accordance with an embodiment of the present invention.

Referring to FIGS. 24A and 24B, a second embodiment of a simplified tire building drum 400 is shown. The tire building drum 400 includes a first drum half 402 and a second drum half 404. Each of the first and second drum halves 402, 404 includes a cylindrical outer drum surface 406, an inner drum surface 408, an external drum end 410, and an internal drum end 412. The tire building drum 400 may further include a lengthwise axis 414 upon which each drum half is centered. The lengthwise axis 414 is defined between the external drum ends 410 of the first and second drum halves 402, 404. The tire building drum 400 may be configured to be received by the headstock arm 302 of the headstock 300. The headstock arm includes at least a bead lock ball screw 304 which is configured to position the first and second drum halves 402, 404 along the lengthwise axis 414, either closer together or further apart. The internal drum ends 412 of the first and second drum halves 402, 404 may either touch or be spaced apart when moving along the lengthwise axis 414. In other embodiments (not shown), the headstock arm may include additional passageways for interfacing various materials, such as air, oil, power, or the like, with the tire building drum 400.

Each of the first and second drum halves 402, 404 may further include a plurality of guide slots 416 disposed between the outer drum surface 406 and the inner drum surface 408. The plurality of guide slots 416 may extend parallel to the lengthwise axis 414. Each of the guide slots 416 may be open to its external drum end 410. The guide slots 416 may be equally circumferentially spaced around each external drum end 410 of the first and second drum halves 402, 404.

The tire building drum 400 may further include a plurality of ramps 418. Each ramp 418 is associated with one of the guide slots 416. As illustrated, each ramp 418 may extend from the inner drum surface 408 of either the first or second drum half 402, 404 proximate its respective guide slot 416. Each ramp 418 may extend into an internal drum area 420. The internal drum area 420 includes a means (not shown) for interfacing with the headstock 300 which is configured to position the tire building drum 400. The internal drum area 420 may be defined by the inner drum surface 408 between the external drum ends 410 of the first and second drum halves 402, 404. Alternatively, each ramp 418 may extend from its respective guide slot 416.

The tire building drum 400 may include a first bead lock groove 422 and a second bead lock groove 424, which may be positioned circumferentially around the outer drum surface 406 of the first and second drum halves 402, 404, respectively. The first bead lock groove 422 may be positioned adjacent to the guide slots 416 extending from the external drum end 410 of the first drum half 402. The second bead lock groove 424 may be positioned adjacent to the guide slots 416 extending from the external drum end 410 of the second drum half 404.

The tire building drum may further include a support ring 426 positioned between the internal drum ends 412 of the first and second drum halves 402, 404. The support ring 426 may be configured to support the tire carcass 132 when received by the tire building drum 400. The support ring 426 may have a diameter 428 less than that of the inner drum surface 408 of the tire building drum 400 so as to enable the internal drum ends to slide over the support ring 426. The tire building drum 400 may include other various elements necessary for proper operation.

Thus, although there have been described particular embodiments of the present invention of a new and useful MODULAR TIRE TURN-UP APPARATUS it is not intended that such references be construed as limitations upon the scope of this invention except as set forth in the following claims.

What is claimed is:

1. A tire building system comprising:
a tire building drum including a cylindrical outer drum surface, an inner drum surface, a first drum end, a second drum end, and a lengthwise direction defined between the first and second drum ends, each of the first and second drum ends including a plurality of guide slots disposed between the inner drum surface and the outer drum surface and extending parallel to the lengthwise direction, the guide slots being open at the respective drum end, the guide slots being spaced equally circumferentially around the first and second drum ends; and
a tire turn-up device separable from the tire building drum in the lengthwise direction and configured to move in the lengthwise direction to selectively engage and disengage the drum, the tire turn-up device including a first plurality of fingers configured to be received through the plurality of guide slots from the first drum end or the second drum end as the tire turn-up device moves in the lengthwise direction towards the tire building drum, the first plurality of fingers being movable between a radially retracted position and a radially extended position.

2. The tire building system of claim 1, wherein the first plurality of fingers are parallel with the lengthwise direction when positioned in the radially retracted position.

3. The tire building system of claim 1, wherein:
the tire building drum is a selected drum of a group of drums of different drum diameters; and
the first plurality of fingers are arranged in a circular equally spaced first finger pattern, and the tire turn-up device is configured such that a first finger diameter of the first finger pattern is adjustable to correspond to the drum diameter of the selected drum.

4. The tire building system of claim 1, wherein
the first plurality of fingers has a first configuration where the fingers are equally spaced in a first finger pattern;
the first plurality of fingers has a second configuration where the fingers are repositioned to allow insertion of a second plurality of fingers between the first plurality of fingers; and
in the second configuration the combined first and second pluralities of fingers are equally spaced in a second finger pattern.

5. The tire building system of claim 1, wherein:
the tire building drum includes a plurality of ramps, each ramp of the plurality of ramps being defined within one of the guide slots of the plurality of guide slots and spaced in the lengthwise direction from a closest one of the first or second drum ends; and
the ramps are configured to engage the first plurality of fingers when the first plurality of fingers are in the radially retracted position.

6. The tire building system of claim 5, wherein
the tire turn-up device is configured to move in the lengthwise direction toward the drum to cause the first plurality of fingers to engage the plurality of ramps; and
the plurality of ramps are configured to guide movement of the plurality of fingers between the radially retracted position and the radially extended position as the turn-up device is moved in the longitudinal direction toward the drum.

7. The tire building system of claim 5, wherein
each ramp of the plurality of ramps extends at least partially beyond the inner drum surface.

8. The tire building system of claim 1, wherein:
the first plurality of fingers has a first configuration where the fingers are equally spaced in a first finger pattern having a first finger pattern diameter;
the first plurality of fingers has a second configuration where the fingers are repositioned to allow insertion of a second plurality of fingers between the first plurality of fingers; and
in the second configuration the combined first and second pluralities of fingers are equally spaced in a second finger pattern having a second finger pattern diameter.

9. The tire building system of claim 8, wherein:
the second finger pattern diameter is larger than the first finger pattern diameter.

\* \* \* \* \*